US011498500B1

(12) United States Patent
Pertsel et al.

(10) Patent No.: US 11,498,500 B1
(45) Date of Patent: Nov. 15, 2022

(54) DETERMINING COMFORT SETTINGS IN VEHICLES USING COMPUTER VISION

(71) Applicant: Ambarella International LP, Santa Clara, CA (US)

(72) Inventors: Shimon Pertsel, Mountain View, CA (US); Patrick Martin, Rochester, MI (US)

(73) Assignee: Ambarella International LP, Santa Clara, CA (US)

(*) Notice: Subject to any disclaimer, the term of this patent is extended or adjusted under 35 U.S.C. 154(b) by 53 days.

(21) Appl. No.: 17/028,190

(22) Filed: Sep. 22, 2020

Related U.S. Application Data

(63) Continuation of application No. 16/118,787, filed on Aug. 31, 2018, now Pat. No. 10,850,693.

(51) Int. Cl.
| | | |
|---|---|---|
| *B60R 21/00* | (2006.01) |
| *B60R 21/02* | (2006.01) |
| *G06K 9/66* | (2006.01) |
| *G06K 9/60* | (2006.01) |
| *B60R 16/037* | (2006.01) |
| *B60N 2/02* | (2006.01) |
| *G05D 1/00* | (2006.01) |
| *G06V 20/59* | (2022.01) |
| *G06V 40/10* | (2022.01) |

(52) U.S. Cl.
CPC .......... *B60R 16/037* (2013.01); *B60N 2/0244* (2013.01); *G05D 1/0088* (2013.01); *G06V 20/59* (2022.01); *G06V 40/103* (2022.01)

(58) Field of Classification Search
None
See application file for complete search history.

(56) References Cited

U.S. PATENT DOCUMENTS

| | | | | |
|---|---|---|---|---|
| 2008/0260239 A1* | 10/2008 | Han | ..................... | G06V 10/446 382/156 |
| 2008/0306656 A1* | 12/2008 | Baumann | ............. | B60N 2/0248 701/45 |
| 2017/0330029 A1* | 11/2017 | Turcot | ................. | G06V 30/194 |
| 2018/0178808 A1* | 6/2018 | Zhao | .................... | B60K 28/066 |
| 2019/0084372 A1* | 3/2019 | Gallagher | ............ | G05B 19/042 |
| 2019/0176837 A1* | 6/2019 | Williams | .............. | B60W 40/08 |
| 2019/0225232 A1* | 7/2019 | Blau | ................... | B60W 50/082 |

* cited by examiner

*Primary Examiner* — Adam D Tissot
(74) *Attorney, Agent, or Firm* — Christopher P. Maiorana, PC

(57) ABSTRACT

An apparatus includes a capture device and a processor. The capture device may be configured to generate a plurality of video frames. The processor may be configured to perform operations to detect objects in the video frames, detect users based on the objects detected in the video frames, determine a comfort profile for the users and select a reaction to adjust vehicle components according to the comfort profile of the detected users. The comfort profile may be determined in response to characteristics of the users. The characteristics of the users may be determined by performing the operations on each of the users. The operations detect the objects by performing feature extraction based on weight values for each of a plurality of visual features that are associated with the objects extracted from the video frames. The weight values are determined by the processor analyzing training data prior to the feature extraction.

19 Claims, 17 Drawing Sheets

DETERMINING COMFORT SETTINGS IN VEHICLES USING COMPUTER VISION

This application relates to U.S. Ser. No. 16/118,787, filed Aug. 21, 2018. This application also relates to U.S. Ser. No. 15/965,891, filed Apr. 28, 2018, which relates to U.S. Provisional Application No. 62/653,008, filed Apr. 5, 2018. This application also relates to U.S. Ser. No. 16/001,242, filed Jun. 6, 2018 and U.S. Ser. No. 16/033,724, filed Jul. 12, 2018. Each of the mentioned applications are hereby incorporated by reference in its entirety.

FIELD OF THE INVENTION

The invention relates to computer vision generally and, more particularly, to a method and/or apparatus for determining comfort settings in vehicles using computer vision.

BACKGROUND

Many vehicle owners share a vehicle with other people (i.e., multiple family members use the same car). People can have vastly different body sizes and proportions. When using a car, a driver often configures various vehicle components such as seat locations, mirrors, temperature settings, etc. Configuring various vehicle components is done for a combination of safety (i.e., to ensure a driver can reach the gas/brake pedals, see the surroundings of the vehicle in the mirrors, etc.) and comfort. Similarly, passengers might have varying comfort preferences.

When sharing a vehicle, different users often have different configurations to suit an individual body type. When a different driver uses the vehicle, the user has to re-configure the various vehicle components. In some situations (i.e., one tall driver that needs the seat all the way back and one short driver that needs the seat as close to the steering wheel as possible), a user of a vehicle might even have difficulty entering the vehicle to re-configure the various vehicle components.

It would be desirable to implement determining comfort settings in vehicles using computer vision.

SUMMARY

The invention concerns an apparatus comprising a capture device and a processor. The capture device may be configured to generate a plurality of video frames. The processor may be configured to perform computer vision operations to detect one or more objects in the video frames, detect users based on the objects detected in the video frames, determine a comfort profile corresponding to the users detected and select a reaction to adjust an environment according to the comfort profile of the users detected. The comfort profile may be determined in response to characteristics of the users. The characteristics of the users may be determined by performing the computer vision operations on each of the users. The computer vision operations detect the objects by performing feature extraction based on weight values for each of a plurality of visual features that are associated with the objects extracted from the video frames. The weight values are determined by the processor analyzing training data prior to the feature extraction.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing comfort settings in vehicles using computer vision that may (i) utilize interior cameras of a vehicle, (ii) generate comfort profiles for individual users of a vehicle using facial recognition, (iii) determine a comfort profile for a user based on a body type, (iv) pre-adjust seats for a person entering a vehicle, (v) determine characteristics of occupants of a vehicle, (vi) implement fleet learning to train a convolutional neural network, (vii) utilize computer vision with sensor fusion and/or (viii) be implemented as one or more integrated circuits.

Embodiments of the present invention may utilize interior cameras and communication systems of vehicles (e.g., 3G, 4G, LTE, 5G, etc.). The present invention may implement computer vision to determine information about the interior and/or exterior of a vehicle. Using computer vision, embodiments of the present invention may classify and/or determine characteristics of objects in a vehicle (e.g., occupants, seats, steering wheels, handheld devices, seatbelts, etc.). In an example, body characteristics of an occupant may be analyzed to create a comfort profile for the occupant in a particular seat. In another example, facial recognition may be implemented to create a comfort profile for a particular individual. Once a comfort profile is selected for a particular vehicle user then a reaction may be performed to adjust various vehicle characteristics (e.g., seats, steering wheel height, mirror angles, temperature settings, infotainment center settings, etc.). In another example, fleet learning may be implemented to gather statistics about how users with similar body types prefer to configure the various vehicle characteristics. By using computer vision to determine and/or understand the characteristics of each occupant of the vehicle, suitable reactions may be performed to pre-adjust seats and/or other vehicle characteristics of a person entering a vehicle.

Figure 1:
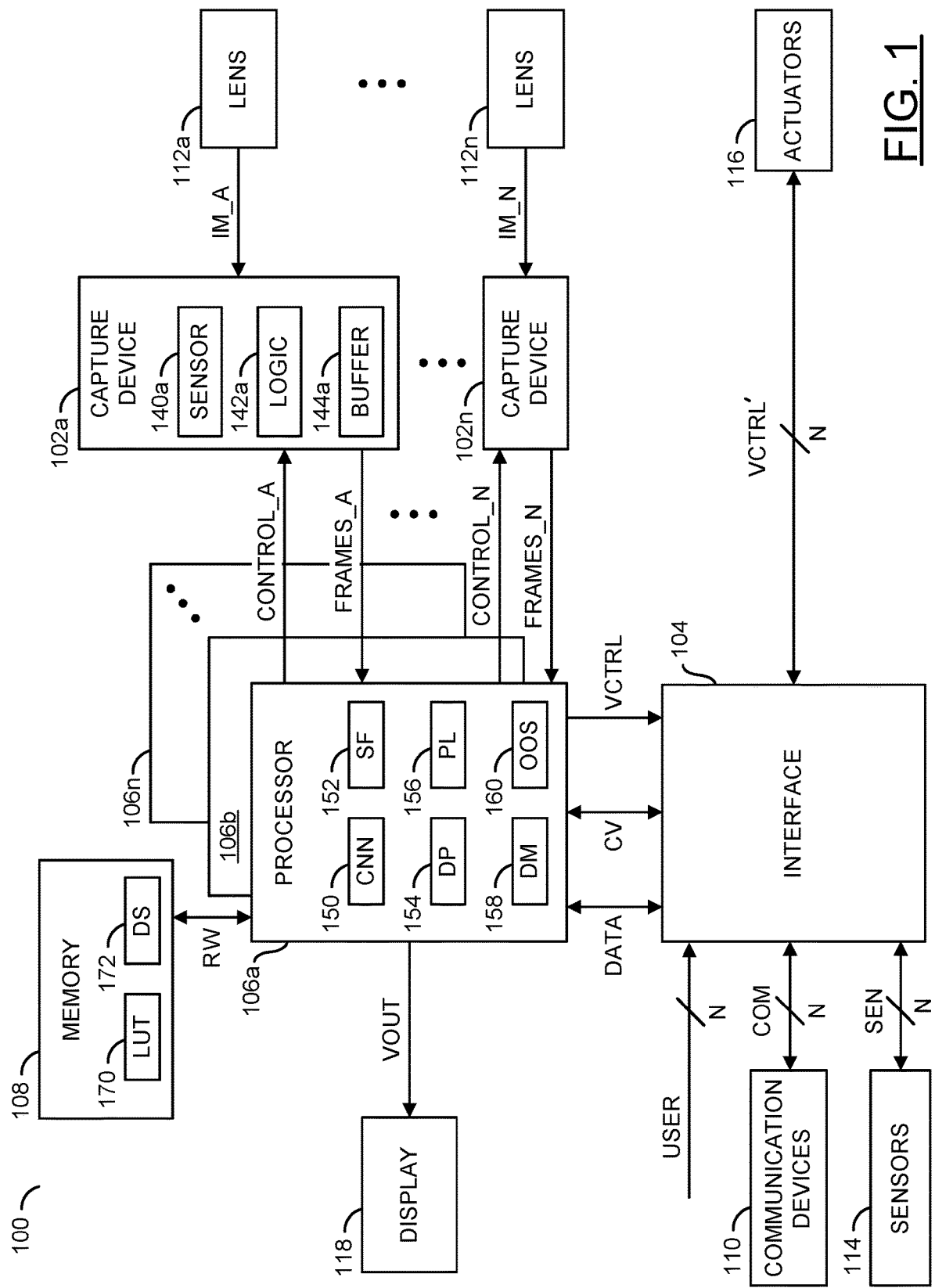
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 5.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
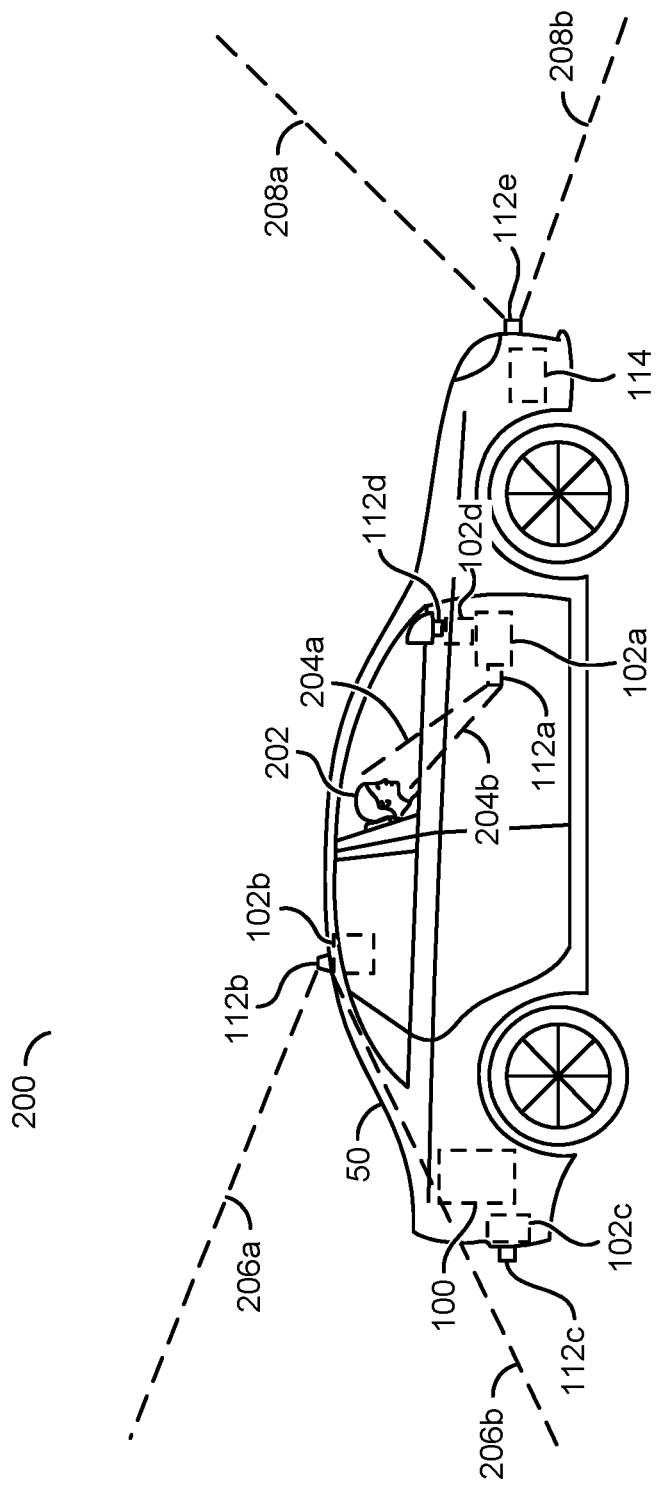
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be implemented to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
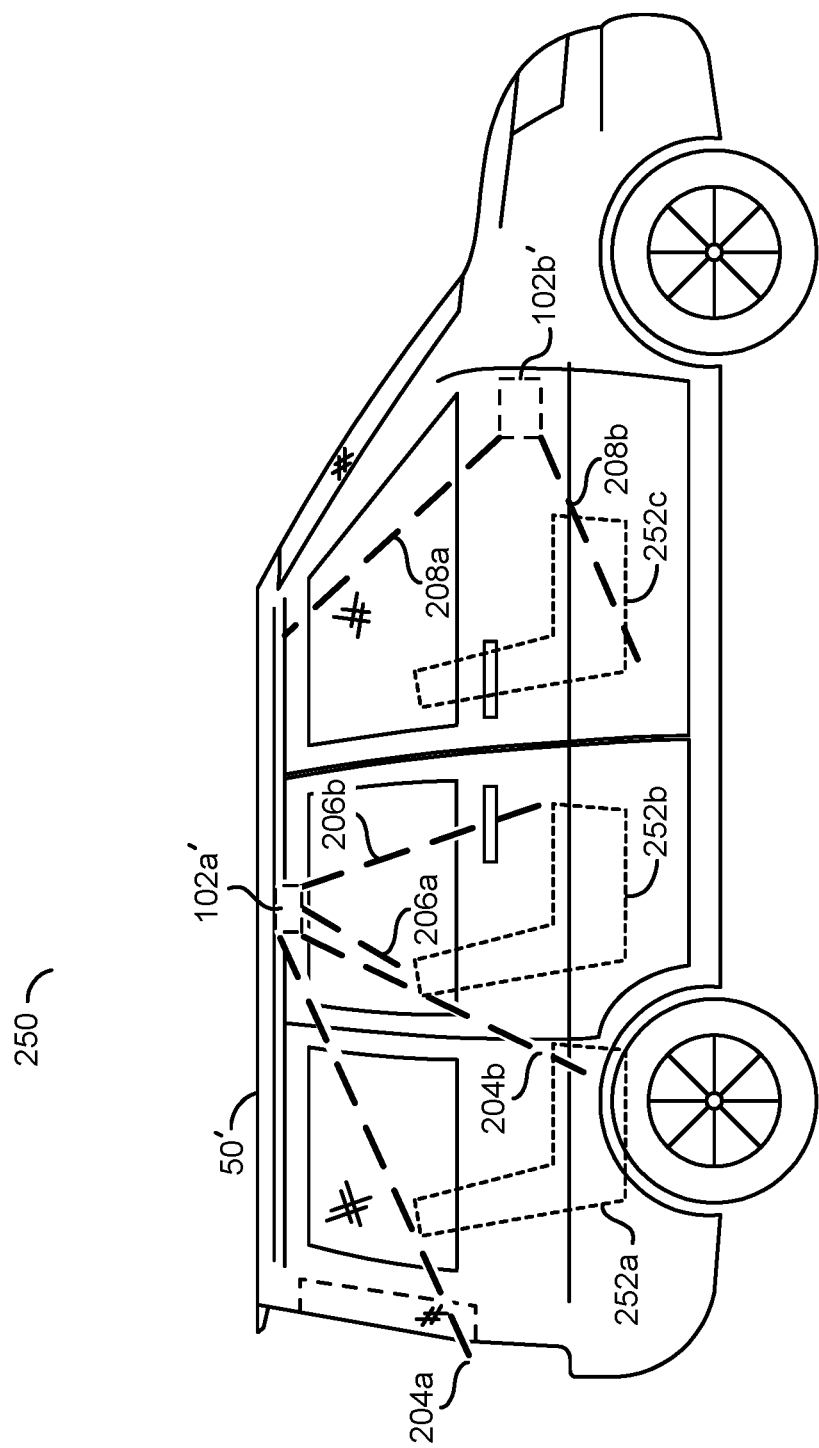
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the vehicle 50' are shown. Multiple rows of seats 252a-252c are shown in the vehicle 50'. Each of the rows of seats 252a-252c may be monitored to detect and/or classify one or more occupants of the vehicle 50'.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver, other occupants, physical characteristics of people in the vehicle, facial expressions of people in the vehicle, fields of view of the people in the vehicle, etc.). The processors 106a-106n may be configured to determine an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person. For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Figure 4:
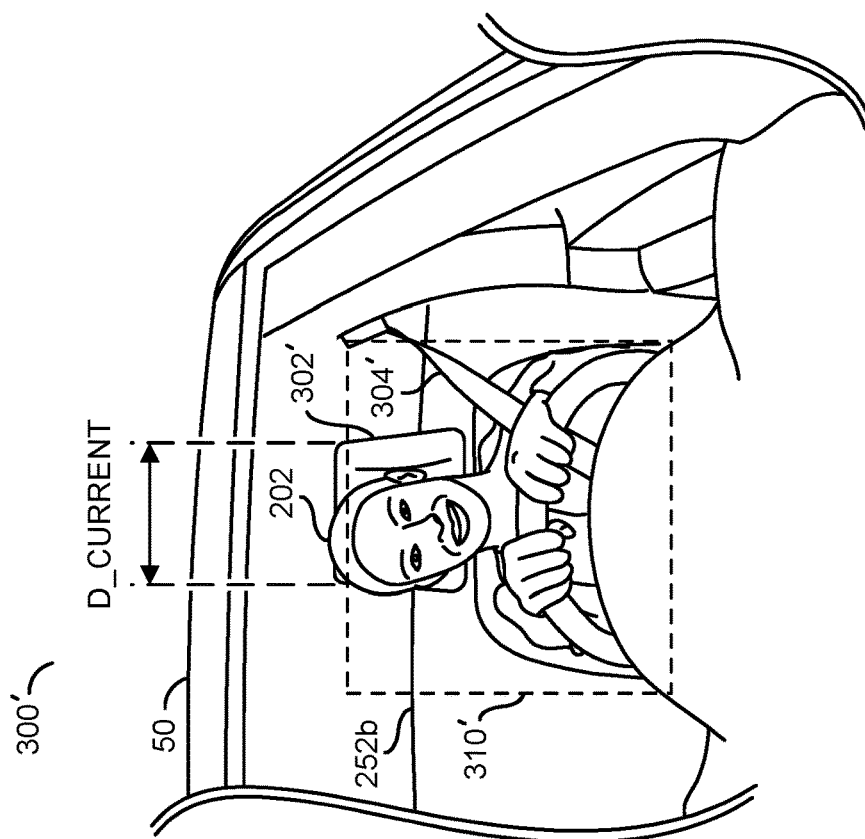
FIG. 4 is a diagram illustrating an object comparison between a reference video frame and a captured video frame.
Figure 4:
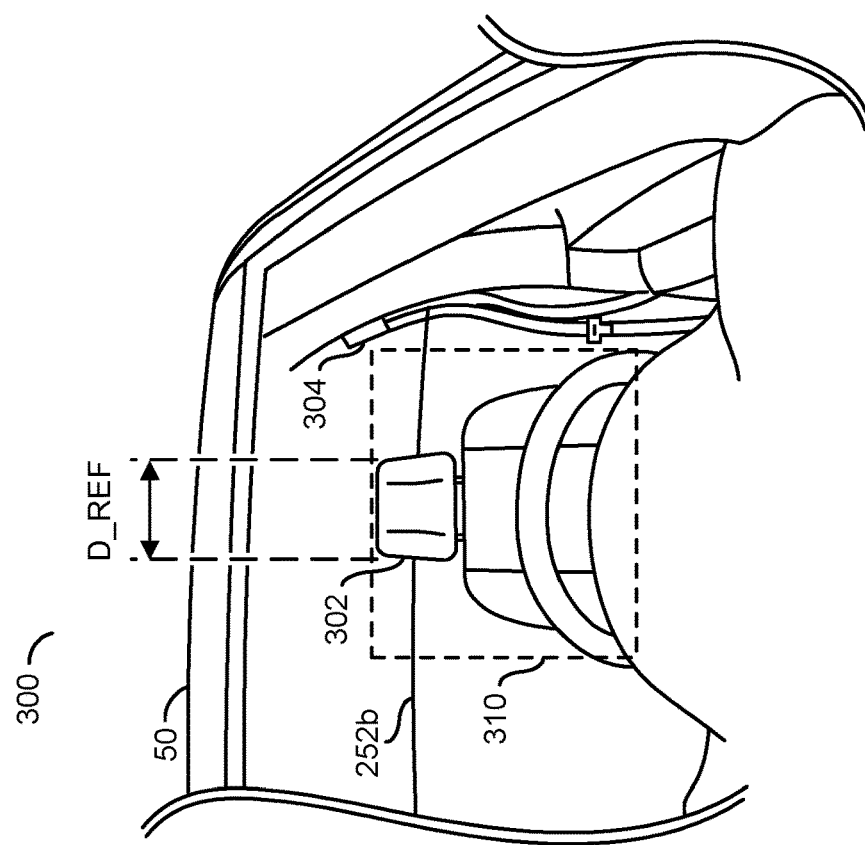

Referring to FIG. 4, a diagram illustrating an object comparison between a reference video frame 300 and a current video frame 300' is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D REF) of the reference object 302 (e.g., based on the number of pixels occupied in the reference video frame 300). In some embodiments, the look up table 170 may store the width D REF. The width D REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D CURRENT to the reference size D REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
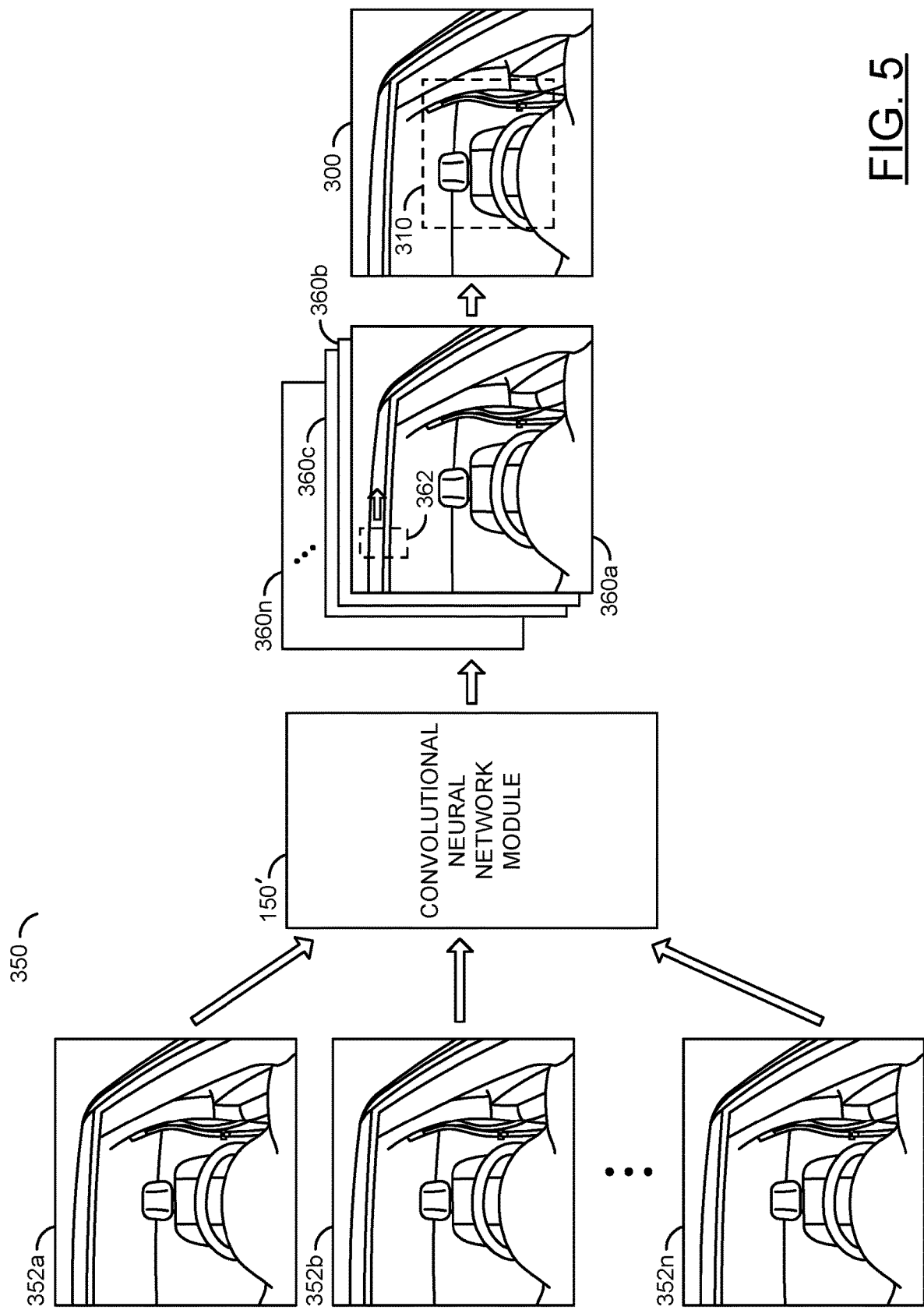
FIG. 5 is a diagram illustrating an example visualization of training a convolutional neural network for object detection using fleet learning.

Referring to FIG. 5, a diagram illustrating an example visualization 350 of training the convolutional neural network 150' for object detection using fleet learning is shown.

To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, $YC_bC_r$, $YP_bP_r$, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 6:
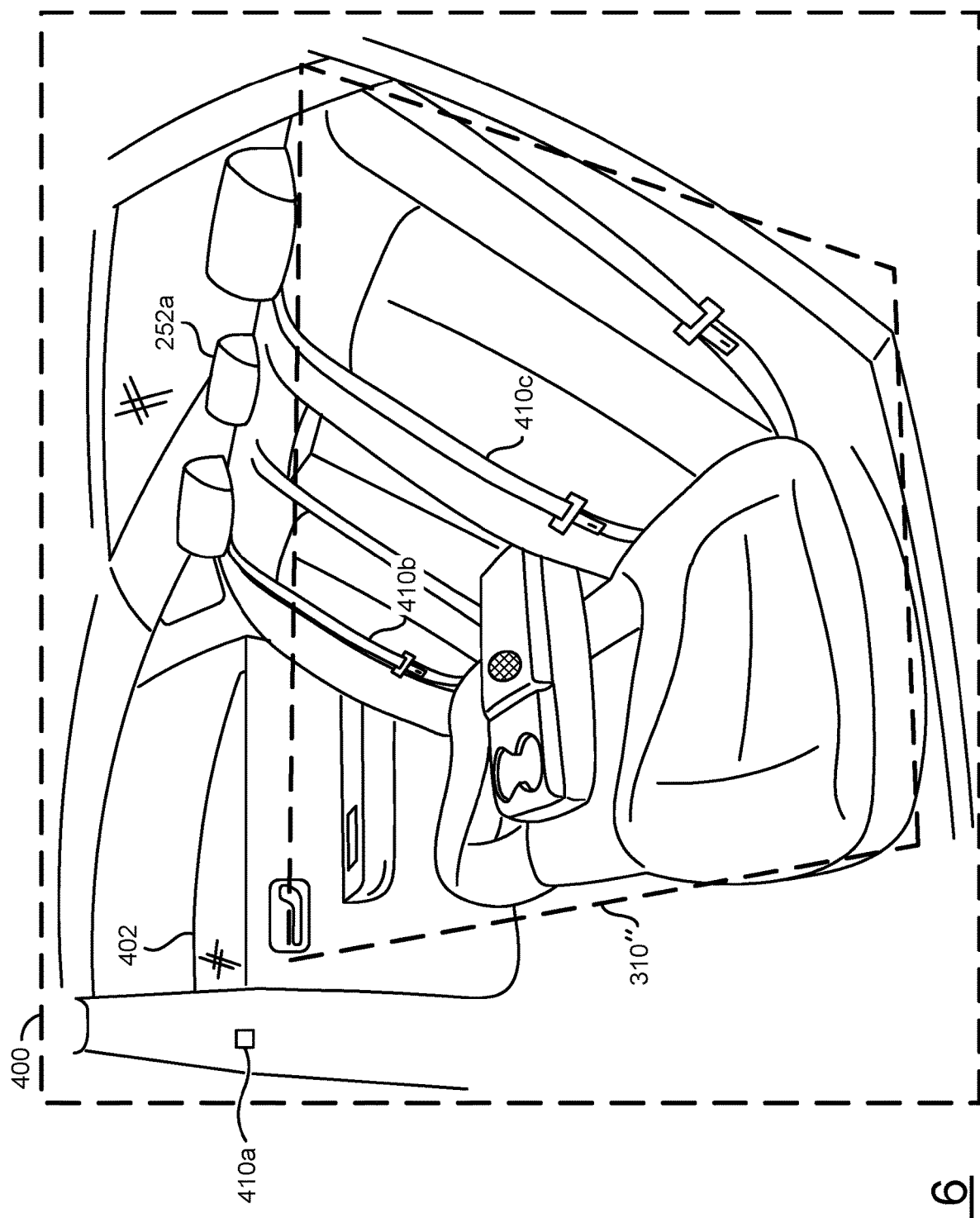
FIG. 6 is a diagram illustrating detecting reference objects corresponding to an empty vehicle seat in a video frame.

Referring to FIG. 6, a diagram illustrating detecting reference objects 310" corresponding to an empty vehicle seat in a video frame 400 is shown. The video frame 400 may be video data (e.g., one example video frame from a series of video frames in the video data) of the interior of the vehicle 50. The video frame 400 may be an example targeted wide angle view of the interior of the vehicle 50 captured by one of the capture devices 102a-102n. The video frame 400 is shown directed at the back row of seats 252a.

In some embodiments, the video frame 400 may be an example of reference frame. For example, the reference frame 400 may be used by the apparatus 100 to learn the locations of various reference objects in the vehicle 50. In another example, the video frame 400 may be used as video data for the training data 352a-352n. In yet another example, the video frame 400 may be an example of a current video frame undergoing the computer vision operations.

An open window 402 is shown in the video frame 400. In some embodiments, the locations of windows may be used to train the CNN module 150. In some embodiments, the processors 106a-106n may determine characteristics of various objects detected in the video frame 400. In the example shown, the processors 106a-106n may determine the characteristic of the window 402 is open.

Examples of mitigation responses 410a-410c are shown in the video frame 400. In some embodiments, the mitigation responses 410a-410c may be deployed and/or activated in response to a collision and/or an imminent collision. For example, the capture devices 102a-102n that provide an exterior view from the vehicle 50 may determine that an impact, collision and/or evasive maneuver is imminent by analyzing the video data and/or using the sensor fusion module 152 to analyze the sensors 114. To protect occupants of the vehicle 50, the mitigation responses 410a-410c may be deployed (e.g., before the impact and/or when the impact is detected). The apparatus 100 may generate the signal VCTRL' to activate one or more of the actuators 116. The actuators 116 may be used to operate on the mitigation response devices 410a-410c.

In the example shown, the mitigation response device 410a may be an air bag (e.g., a side air bag). In the example shown, the mitigation response device 410b and/or the mitigation device 410c may be seatbelts. For example, in response to the imminent collision, the actuators 116 may activate seatbelt pre-tensioning for the seatbelts 410b-410c. In another example, in response to the imminent collision, the actuators 116 may deploy the air bag 410a. The number and/or types of the mitigation response devices 410a-410c implemented may be varied according to the design criteria of a particular implementation. For example, the interface 104 may translate instructions from the processors 106a-106n to corresponding signals compatible with the actuators 116. In some embodiments, the interface 104 may provide an API for the actuators 116. For example, the interface 104 may translate a command to slow down from the processors 106a-106n based on the available actuators 116.

An example detected object 310" is shown. The example detected object 310" may be an unoccupied seat. In some embodiments, the unoccupied seat 310" may be a reference object used for comparison when a person is in the same seat in another video frame. In some embodiments, when the video frame 400 is a current video frame, the unoccupied seat 310" may represent a portion of the vehicle 50 that is the least vulnerable and/or not vulnerable. For example, if the unoccupied seat 310" does not have an occupant, then any mitigation reactions initiated by the apparatus 100 for the unoccupied seat 310" may be considered a low priority.

Figure 7:
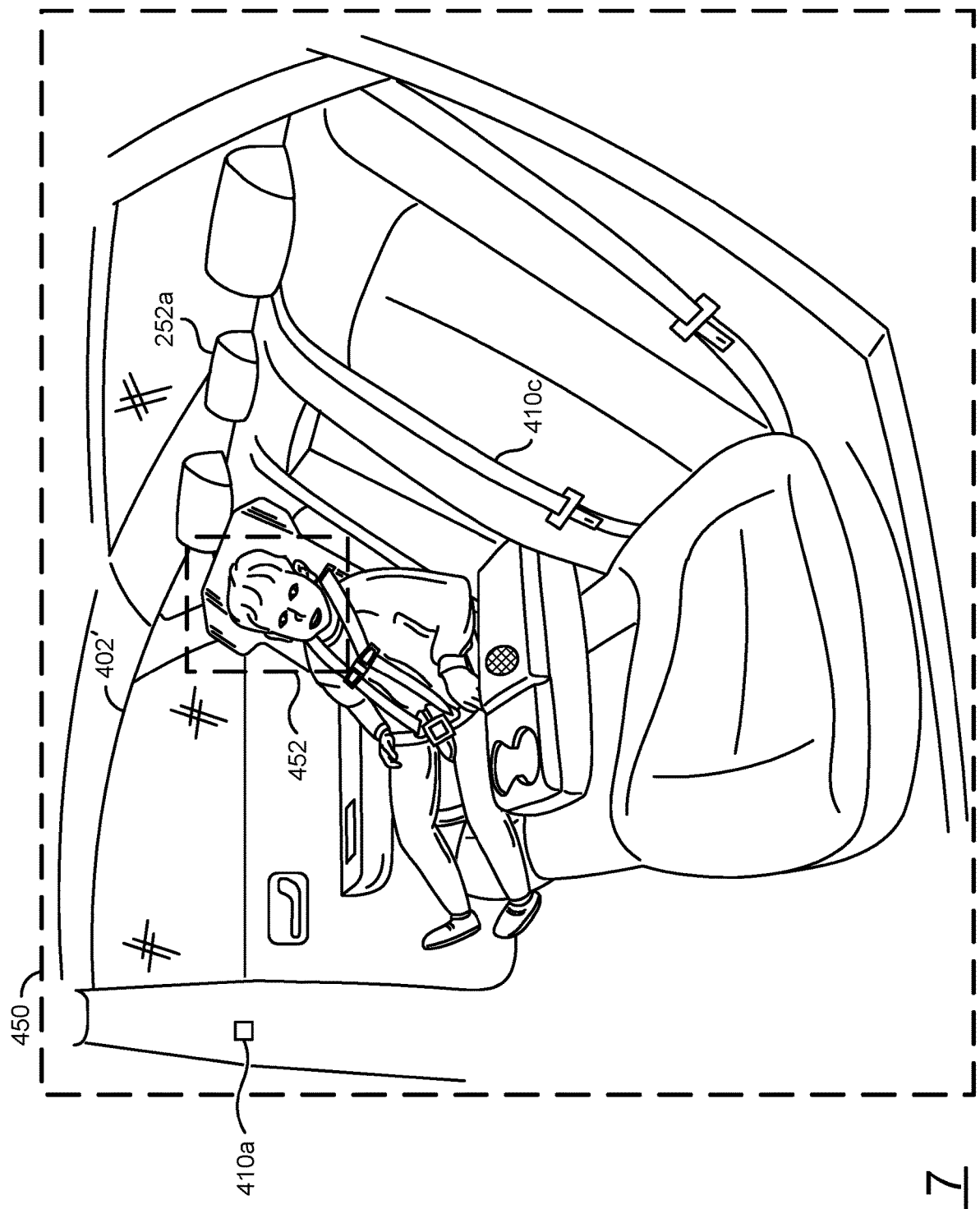
FIG. 7 is a diagram illustrating detecting a child in a video frame.

Referring to FIG. 7 a diagram illustrating detecting an occupant in a video frame 450 is shown. The video frame 450 may be video data (e.g., one example video frame from a series of video frames in the video data) of the interior of the vehicle 50. The video frame 450 may be generated similar to the video frame 400 (e.g., described in association with FIG. 6).

The video frame 450 is shown directed at the back row of seats 252a. An occupant 452 is shown in the video frame 450. In the example shown, the occupant 452 may be a small child. The small child 452 may be an example of a vulnerable occupant.

Generally, the driving policy module 154 may determine a vulnerability of the occupant 452. In some embodiments, different product vendors may program the driving policy module 154 with preferences on how to rank the vulnerability of the occupant 452. In some embodiments, the driving policy module 154 may be programmed according to local regulations. How the vulnerability of the occupant 452 is determined may be varied according to the design criteria of a particular implementation.

The processors 106a-106n may utilize the CNN module 150 to identify, detect and/or classify the occupant 452 (e.g., as a small child, in the example shown). The CNN module 150 may implement the computer vision operations to determine the characteristics of the occupant 452 (e.g., age, body position, whether the occupant is pregnant, etc.). The processors 106a-106n may utilize the classification of the occupant 452 and/or the characteristics of the occupant 452 determined using the computer vision operations in conjunction with the driving policy module 154 to determine the vulnerability of the occupant 452.

The level and/or rank of vulnerability determined by the processors 106a-106n may not imply a weakness, frailty and/or importance of the occupants 452. For example, in a traditional emergency situation, saving women and children is often prioritized. The vulnerability may comprise a likelihood of harm and/or a need for protection. For example, the occupant 452 that is closer to the impact point may be more vulnerable than another of the occupants 452. In another example, particular body parts (e.g., head, chest, arteries, etc.) may be more vulnerable than other body parts due to the risk of catastrophic injury. The level and/or rank of vulnerability of a particular occupant may change (e.g., more vulnerable if a vital body part is exposed, more vulnerable if not wearing a seat belt, less vulnerable if wearing a helmet, etc.). The level and/or rank of vulnerability may be used to prioritize which of the occupants 452 to protect when selecting the impact mitigation reaction.

In one example, a baby may be considered a highly vulnerable occupant. In another example, a healthy adult may be considered less vulnerable than a child. In yet another example, an elderly person may be considered more vulnerable than a healthy adult. In still another example, a person who is pregnant may be considered highly vulnerable. In another example, an empty seat may have the lowest vulnerability ranking since there may be nothing to protect. In yet another example, a pet may be considered less vulnerable than a child. In some embodiments, inanimate objects may have some degree of vulnerability compared to other objects (e.g., a highly valued object might be more important to protect than a worthless item). The level of vulnerability for the occupant 452 may be varied according to the design criteria of a particular implementation.

Generally, each occupant 452 of the vehicle 50 may be detected by the processors 106a-106n. The processors 106a-106n may determine various characteristics of the occupants 452 to determine how vulnerable each occupant may be. Each occupant 452 may be accorded a level of vulnerability according to the driving policy module 154. In an example, the level of vulnerability may enable the processor 106a-106n to rank a vulnerability of each of the occupants (e.g., from highest to lowest).

In some embodiments, based on the vulnerability ranking, the processors 106a-106n may determine how to prioritize any impact mitigation reactions. For example, the safety of a person carrying a child may be prioritized over a healthy adult since the healthy adult may be more likely to withstand injury.

In some embodiments, the processors 106a-106n may implement the computer vision operations to understand how a person may be vulnerable. In an example, a healthy adult may be vulnerable if the adult is riding in the passenger seat having a body position with feet resting on the dashboard (e.g., deploying an air bag as an impact mitigation reaction may cause more harm based on the body position). In another example, particular areas of the body of the occupants 452 may be more vulnerable (e.g., the midsection of a pregnant woman may be more vulnerable than the shoulders of the same person). How the vulnerability of occupants 452 are ranked and/or how different areas of the body of each occupant 452 are ranked may be varied according to the design criteria of a particular implementation.

The CNN module 150 may be configured to classify objects as the occupant 452. The CNN module 150 may further classify the occupant as a particular type and/or class of occupant (e.g., a child, a pet, an adult, an elderly person, a differently-abled person, etc.). The CNN module 150 may further determine characteristics of the occupant 452 based on the characteristics detected. The processor 106a-106n and/or the driving policy module 154 may determine a vulnerability of the occupant 452 based on the classification and/or the characteristics detected using the computer vision operations. The types of object classifications may be varied according to the design criteria of a particular implementation.

The video analytics and/or computer vision operations performed by the CNN module 150 may process the video frame 450 and/or other video signals for biometric markers to determine the characteristics of the occupant 452. For example, one or more of age, height and/or weight may be biometric markers used to determine the vulnerability of the occupant 452. The biometric markers may be used to differentiate between a child, an adolescent, etc. (e.g., a person that may not be capable of protecting themselves) and a young adult, teenager, adult, etc. (e.g., a person that may be less vulnerable).

In some embodiments, the age, height, weight and/or other biometric markers (e.g., characteristics) used to determine the vulnerability of the occupant 452 may be similar to attributes used in regulations for sitting in the front seat of a vehicle and/or other vehicle safety regulations. Various biometric markers may be stored as reference data in the look up table 170. For example, the look up table 170 may store different heights, weights, ages, etc. applicable to different regions (e.g., based on different regulations in a particular city/state/province/country). The types of biometric markers used to determine a vulnerability of the occupant 452 may be varied according to the design criteria of a particular implementation.

In some embodiments, the CNN module 150 may be configured to detect faces in the video frame 450. In some embodiments, the processor 106a-106n may be configured to recognize faces through facial recognition (e.g., based on faces stored as references in the memory 108). The vulnerability of the occupant 452 may be stored in the look up table 170 in association with the facial detection information corresponding to the occupant 452.

A high confidence level for a vulnerability and/or detection of a particular occupant may indicate that the computer vision result is consistent with the particular type of object (e.g., occupant). A low confidence for a vulnerability and/or detection of a particular occupant may indicate that the computer vision result is inconsistent with the particular type of object (e.g., occupant). Various checks may be performed to determine the confidence level. The vulnerability ranking may be performed when the confidence level is above a pre-defined threshold. In some embodiments, information from the vehicle sensors 114 (e.g., an amount of weight detected in a particular seat) may be used to adjust the confidence level.

The impact mitigation may comprise automatic responses by the vehicle 50 (e.g., using the actuators 116) implemented to improve a safety, reduce an amount of injury, increase a chance of survival and/or improve comfort of the occupant 452. For example, the processors 106a-106n may generate the signal VCTRL to the interface 104 and the interface 104 may forward the signal VCTRL' to the appropriate one of the actuators 116 to perform the impact mitigation reaction.

In some embodiments, the window 402' may be one of the mitigation response devices 410a-410c. In the example shown, the window 402' may be determined by the computer vision operations to be in a closed state. For example, opening the window 402' may be an appropriate impact mitigation response to enable the occupant 452 to escape a vehicle after a collision and/or enable rescue workers easier access to the occupant 452 of the vehicle 50. In another example, keeping the window 402' closed may be an appropriate impact mitigation reaction if the vehicle 50 has been submerged in water after a collision to prevent the occupant 452 from drowning.

The apparatus 100 may be configured to distinguish between objects interior to the vehicle 50 (e.g., the small child 452) and objects exterior to the vehicle 50 (e.g., a pedestrian outside the window 402'). For example, depth-sensing techniques may be implemented to determine which of the objects detected in the video frame 450 are inside the vehicle 50. In another example, the video frames from the interior of the vehicle 50 may be compared with video frames of the outside area of the vehicle 50 (e.g., one of the capture devices 102a-102n may capture a similar view outside of the vehicle 50 that may be seen through the window 402' from the video frame 450 captured by another one of the capture devices 102a-102n) to determine which objects are interior and which objects are exterior to the vehicle 50.

Figure 8:
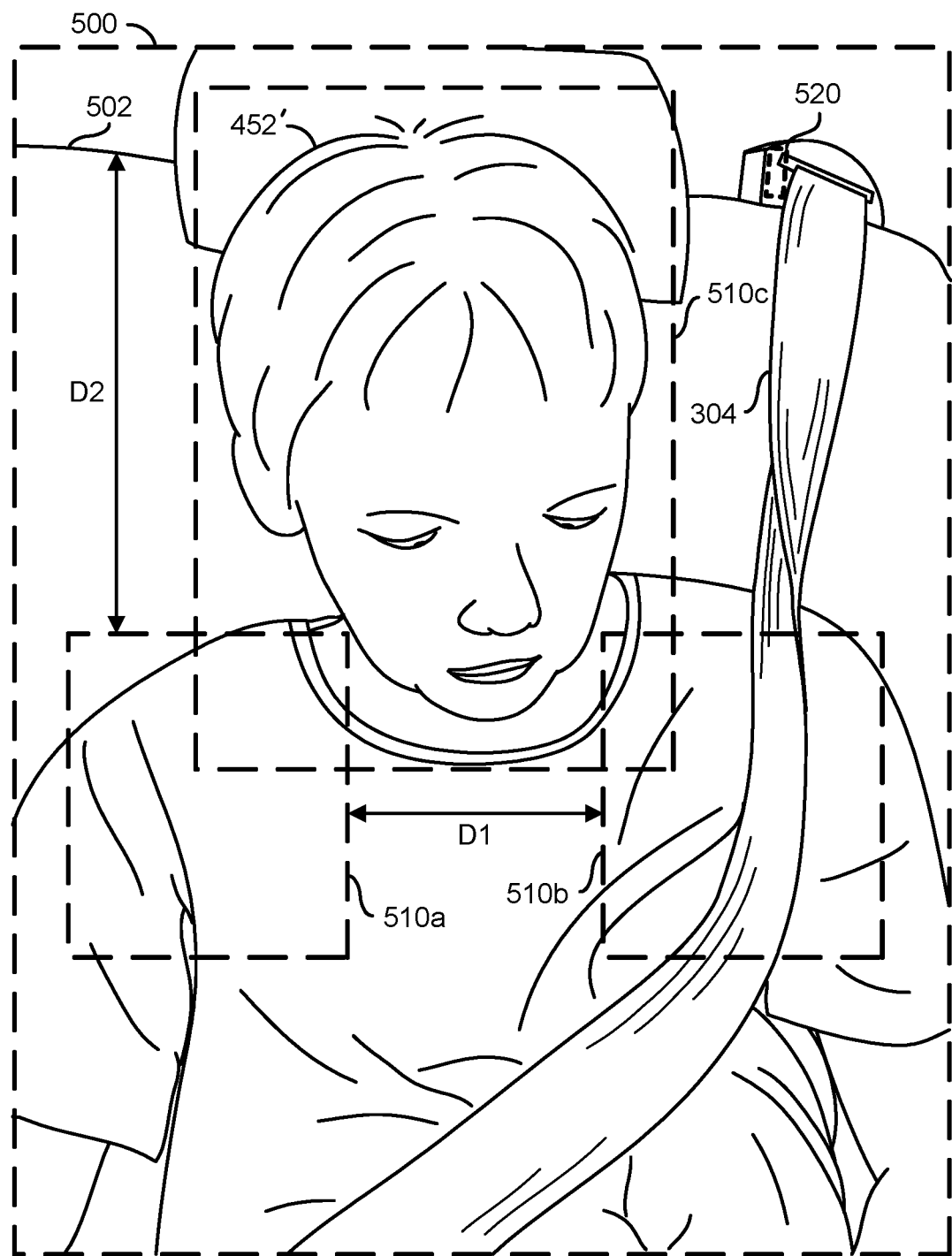
FIG. 8 is a diagram illustrating a processor determining characteristics of an occupant.

Referring to FIG. 8, a diagram illustrating the processors 106a-106n determining characteristics of an occupant is shown. An example video frame 500 is shown. The example video frame 500 may be one of the frames FRAMES_A-FRAMES_N captured using one of the capture devices 102a-102n directed at a seat 502 of the vehicle 50. The occupant 452' is shown in the seat 502. The seatbelt 304 is shown worn by the occupant 452'. In the example shown, one occupant 452' in one seat 502 is shown being analyzed using the computer vision operations implemented by the processors 106a-106n. However, the apparatus 100 may be configured to detect numerous seats (e.g., seats 502a-502n, not shown), seatbelts (e.g., seatbelts 304a-304n, not shown) and/or occupants (e.g., occupants 452a-452n, not shown) for the entire interior of the vehicle 50. While only one occupant, seat and/or seatbelt may be shown for illustrative purposes, aspects of the invention 100 may be similarly applicable and/or performed for each of the seats 502a-502n, seatbelts 304a-304n and/or occupants 452a-452n.

The CNN module 150 may analyze the video frame 500 to determine the characteristics of the occupant 452'. Boxes 510a-510c are shown in the video frame 500 to represent various body parts of the occupant 452' that may be identified using computer vision. In the example shown in FIG. 8, three body parts (e.g., 510a-510c) are shown as identified by the CNN module 150 (e.g., for clarity). However, the CNN module 150 may identify and/or analyze numerous different body parts (e.g., 510a-510n, not shown). The body parts identified may be varied according to the design criteria of a particular implementation.

Analysis of the body parts 510a-510n may be used by the processors 106a-106n to determine the characteristics of the occupant 452'. In the example shown, the body parts 510a-510c may be used to determine a size, orientation, position and/or location of the occupant 452' (e.g., relative to the interior of the vehicle 50 and/or relative to the seat 502). In the example shown, the processors 106a-106n may identify the shoulders 510a-510b of the occupant 452' and/or the head of the occupant 452'. In some embodiments, the computer vision operations may analyze individual body parts and/or the body as a whole.

In the example shown, the box 510a may represent a right shoulder of the occupant 452' and the box 510b may represent a left shoulder of the occupant 452'. The shoulders 510a-510b may represent characteristics of the occupant 452' that have been detected by the processors 106a-106n. A distance D1 is shown between the boxes representing the shoulders 510a-510b. The distance D1 may be used to determine the size and/or width of the occupant 452'. The distance D1 may be illustrative and the determination of the distance D1 may be more accurate than measurements to the boxes 510a-510b shown. For example, the processors 106a-106n may be configured to identify the body parts 510a-510b in the video frame 500 and measure a distance between the body parts 510a-510b. In an example, the distance D1 may be used to determine the characteristics of the occupant 452' to provide one potential source of information for determining a body size and/or characteristics of the occupant 452'.

A distance D2 is shown between the shoulder 510a and the top of the seat 502. The distance D2 may be used to determine a size of the occupant 452' relative to the seat 502. The distance D2 may be illustrative and the determination of the distance D2 may be more accurate than measurements to the box 510a shown. In one example, the measurements may be performed at a pixel level. For example, the age and/or body size of the occupant 452' may be determined by the processors 106a-106n and may be based on the location and/or height of the occupant 452' relative to the seat 502b. While one measurement (e.g., D2) is shown relative to the seat 502, numerous measurements (e.g., width of the body with respect to the seat 502, a distance from the head 510c to the headrest of the seat 502, a distance from the left shoulder 510b to the top of the seat 502, etc.) may be performed by the processors 106a-106n to determine a body size and/or the characteristics of the occupant 452'.

The head 510c of the occupant 452' is shown. The CNN module 150 may determine various characteristics of the head and/or face 510c of the occupant 452'. The size and/or shape of the detected face 510c may be compared to the size and/or shape of other faces (e.g., adults and/or children) by the CNN module 150 to determine an identity of the occupant 452' and/or distinguish the occupant 452' from another occupant. Distances between and/or sizes of various facial features (e.g., eyes, nose, mouth, cheekbones, jaw, chin, eyebrows, forehead, ears, etc.) may be analyzed by the processors 106a-106n and/or compared with statistical data about facial features to identify the occupant 452' as a particular person and/or to store new facial features for a new (e.g., previously unidentified) person. The analysis and/or comparisons performed by the processors 106a-106n may be used to identify the occupant 452' based on the computer vision operations. The types of analysis performed, the facial features analyzed, the comparisons made and/or the statistical information used for comparison may be varied according to the design criteria of a particular implementation.

In some embodiments, the overall size of the head 510c may be used to determine the size of the occupant 452'. In an example, the size of the head 510c may be compared to the overall size of the body of the occupant 452'. The proportion of various body parts may be used to determine the characteristics of the occupant 452'. The processors 106a-106n may be configured to use the detected size of the head 510c as one factor for determining the characteristics of the occupant 452'.

In some embodiments, the characteristics of the occupant 452' may comprise an identity of the user. For example, the characteristics of the occupant 452' may be the identity of the user determined using facial recognition. The processors 106a-106n may associate the identity of the user with a comfort profile. In some embodiments, the characteristics of the occupant 452' may comprise the size, shape and/or proportions of the various body parts 510a-510n. For example, the characteristics of the occupant 452' may be an array of data indicating a body type of the user. The processors 106a-106n may associate the body type of the user with a comfort profile. The type of characteristics (e.g., the identity using facial recognition and/or body type based on measurements of the body parts) used by the processors 106a-106n may be varied according to the design criteria of a particular implementation.

In some embodiments, the processors 106a-106n may determine details of the characteristics of the occupant 452'. For example, the characteristics may comprise the detection of facial hair, detecting breast size, detecting an enlarged Adam's apple, detecting a size and/or shape of a nose, determining a hip width, determining a leg length, detecting types and/or styles of clothing worn, detecting accessories worn (e.g., jewelry, watches, piercings, tattoos, etc.), detecting scars, detecting eye color, detecting skin color, detecting hair style, detecting hair length, detecting hair color, etc. In another example, the computer vision operations may detect temporary conditions that may affect a comfort profile of the occupant 452' (e.g., a baby bump indicating that the occupant 452' is pregnant, a change in weight, a cast worn, etc.). In yet another example, the type of clothing worn may be determined (e.g., the thickness or number of layers of clothing may indicate how much to adjust the temperature). The type of details analyzed and/or considered to determine the characteristics of the occupant 452' and/or the changes made to the comfort profile may be varied according to the design criteria of a particular implementation.

The processors 106a-106n may determine the characteristics of the occupant 452' based on an aggregation of various features detected using the computer vision operations performed by the CNN module 150. Statistical weight may be adjusted for various characteristics. For example, a higher confidence level of an accurate detection of particular characteristic may have more statistical weight than a lower confidence level of accurate detection. In another example, particular characteristics may have a higher statistical weight (e.g., to account for particular factors that may provide a better indication of identity and/or body type such as the facial recognition). The various factors and/or the statistical weights applied by the processors 106a-106n for each type of factor used for determining the age of the occupant 452' may be varied according to the design criteria of a particular implementation.

The processors 106a-106n may be configured to generate a reaction in response to determining the comfort profile for the occupant 452'. The processors 106a-106n may generate the signal VCTRL to generate the reaction. In one example, the reaction implemented by the decision module 158 may be an adjustment of a location of the seat 502. In another example, the reaction implemented by the decision module 158 may be an angle of recline of the seat 502. A block (or circuit) 520 is shown. The circuit 520 may be a motor (e.g., one of the actuators 116) configured to control a fit of the seatbelt 304. In one example, the reaction implemented by the decision module 158 may be to adjust the fit of the seatbelt 304 (by sending the signal VCTRL to actuate the motor 520).

The decision module 158 may select an appropriate reaction in response to the characteristics of the occupant 452' (e.g., the identity and/or body size of the occupant 452') and/or the location of the seat 502 in the vehicle 50 determined as a result of the computer vision operations. The appropriate reaction may correspond to the scenario detected. For example, the comfort profile for the occupant 452' may comprise a number of pre-set conditions. The processors 106a-106n may be configured to detect the current conditions (e.g., a current seat location received from the interface 104, a current temperature in the vehicle 50, a current height of the steering wheel, etc.) and the signal VCTRL may be configured to adjust the various vehicle characteristics (or components) to bring them to the settings indicated by the comfort profile. For example, if the seat 502 is in a maximum distance location from the steering wheel, and the comfort profile indicates that the seat 502 should be moved to the minimum distance location then the reaction may be to move the seat 502 from 100% distance to 0% distance. In another example, if the seat 502 is in a half distance location from the steering wheel, and the comfort profile indicates that the seat 502 should be moved to the minimum distance location then the reaction may be to move the seat 502 from 50% distance to 0% distance. The number and/or types of reactions available for selection may be varied based on the design criteria of a particular implementation.

In one example, the CNN module 150 may detect the shoulders 510a-510b and/or analyze the features of the face 510c and the processors 106a-106n may calculate the size of the occupant 452' and/or determine the identity of the occupant 452'. The processors 106a-106n may also determine a location of the seat 502 with respect to the interior of the vehicle 50. The decision module 158 may select the appropriate reaction based on the location of the seat 502 and/or the characteristics (e.g., identity and/or size) of the occupant 452'. For example, each user may have a comfort profile for each seat location (e.g., stored in the memory 108). The reaction may be selected if the current seat (or other vehicle component) characteristics in the particular seat does not match the comfort profile selected for the user.

Figure 9:
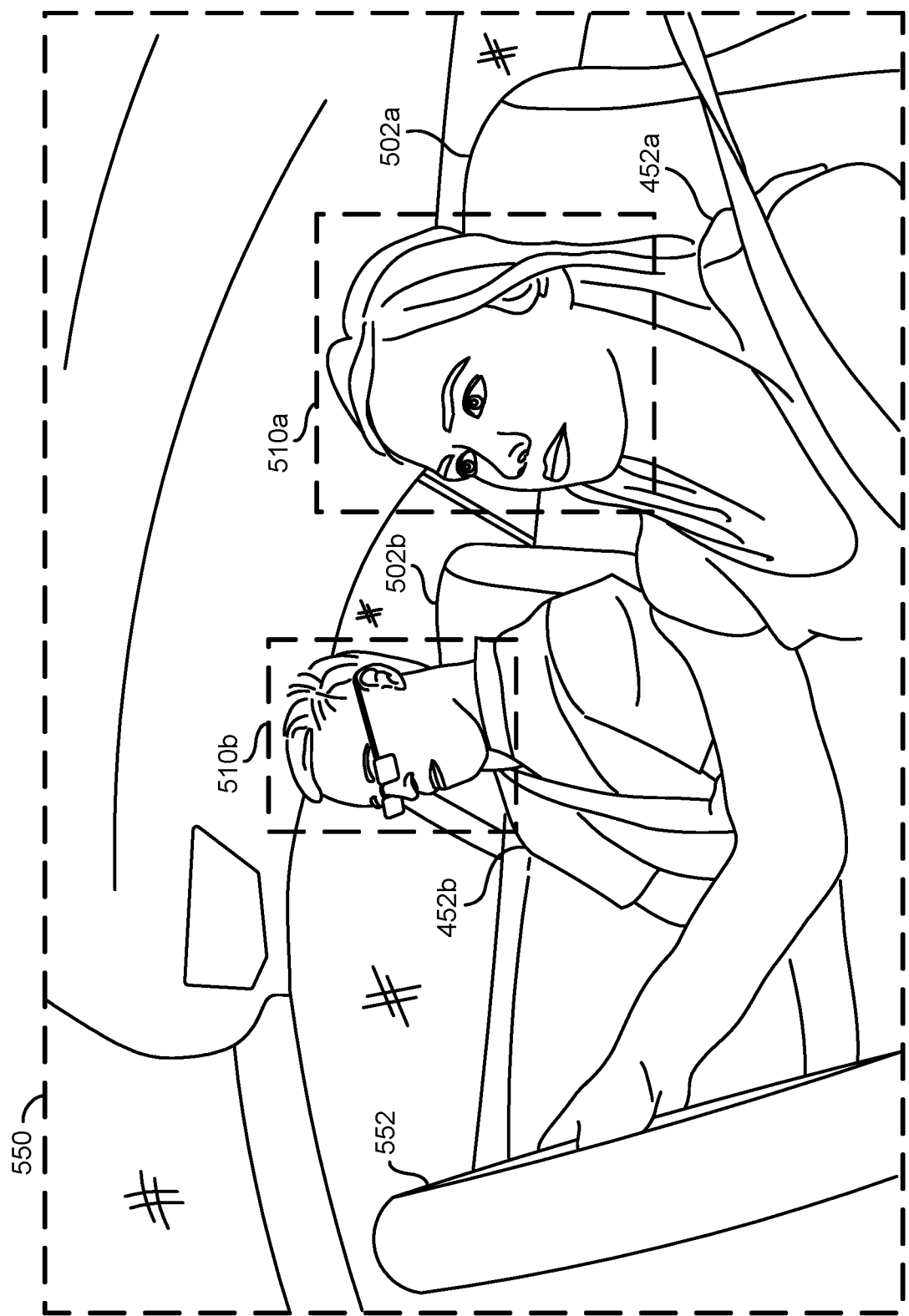
FIG. 9 is a diagram illustrating a processor detecting a young driver and an adult passenger.

Referring to FIG. 9, a diagram illustrating the processors 106a-106n detecting a young driver and an adult passenger is shown. An example video frame 550 is shown. The example video frame 550 may be a video frame of the interior of the vehicle 50 captured by one of the capture devices 102a-102n. The example video frame 550 may be a video frame capturing a front row of seats of the interior of the vehicle 50.

Occupants 452a-452b are shown in the video frame 550. The seats 502a-502b are shown in the video frame 550. The occupant 452a may be in the driver seat 502a. The occupant 452b may be in the passenger seat 502b.

Boxes 510a-510b may represent the faces detected by the processors 106a-106n. The face 510a may be the face of the driver 452a. The face 510b may be the face of the passenger 452b. The processors 106a-106n may further detect the seats 502a-502b. The processors 106a-106n may detect that the face 510a corresponds to the occupant 452a located in the driver seat 502a. The processors 106a-106n may detect that the face 510b corresponds to the occupant 452b located in the passenger seat 502b.

The CNN module 150 may be configured to determine current characteristics of the components of the vehicle 50. In one example, the CNN module 150 may determine the current location of the seats 502a-502b and/or the current angle of recline of the seats 502a-502b. The current location and/or current recline of the seats 502a-502b may be an example of current characteristics of the components of the vehicle 50. The driver 452a is shown holding a steering wheel 552. The CNN module 150 may be configured to detect and/or classify the object 552 as a steering wheel. The CNN module 150 may be further configured to detect a location and/or angle of the steering wheel 552 (e.g., a current configuration and/or orientation of a component of the vehicle 50).

The processors 106a-106n may be configured to determine the characteristics of the occupants 452a-452b for a particular one of the seats 502a-502b. For example, the occupant 452a may have one comfort profile for the driver seat 502a and another comfort profile for the passenger seat 502b. Similarly, the occupant 452b may have one comfort profile for the passenger seat 502b and another comfort profile for the driver seat 502a. Depending on which seat the occupants 452a-452b are sitting in, the comfort profile may be different and/or the reaction generated may be different. Different seats may have different variables and/or settings for the comfort profile. For example, the comfort profile of the occupant 452a for the seat 502a may have a setting for the height and/or angle of the steering wheel 552 but the comfort profile for the occupant 452b for the seat 502b may not have any settings for the steering wheel 552. The number of variables and/or settings and/or the number of comfort profiles for each of the occupants 452a-452b may be varied according to the design criteria of a particular implementation.

In some embodiments, the comfort profile may be individualized for a particular occupant. For example, when facial recognition is implemented by the processors 106a-106n, the user may be identified as a particular person with a high level of confidence. When the particular person is determined with a high level of confidence, then the comfort profile may be individualized for the particular person. For example, the face 510a may be recognized as Alice and the face 510b may be recognized as Bob, and the memory 108 (or a memory of the vehicle 50) may store comfort profiles individualized for Alice and Bob. For example, even if Alice and Bob had similar body sizes and/or proportions, when the occupant 452a is identified as Alice, the reaction may be to adjust the settings to the comfort profile of Alice in the driver seat 452 (e.g., instead of a generalized comfort profile for the detected body size).

In some embodiments, the comfort profile may be determined based on statistical information gathered from numerous users and body types. The comfort profile for a person with a large body may be the comfort profile selected when the occupant 452a is detected as having a large body. For example, if facial recognition does not detect the occupant 452a as Alice, a comfort profile may be selected based on the characteristics of the occupant 452a. In one example, the face 510a and/or other characteristics may indicate that the driver 452a is a young female driver approximately 16 years of age. A comfort profile may be selected based on statistical information about settings for the vehicle components selected by users that are young female drivers of approximately 16 years of age. The decision module 158 may determine the reaction according to the body size/type of a female driver approximately 16 years of age.

The characteristics of the occupants 452a-452b may be determined at varying levels of granularity, according to the design criteria of a particular implementation. For example, the occupant 452a may be determined to have the characteristics of a young female (e.g., a low level of granularity). In another example, the occupant 452a may be determined to be a female that is five feet, five inches tall (e.g., a medium level of granularity). In yet another example, the occupant 452a may be determined to have an upper body length of a particular size, a leg length of a particular size, an arm length of a particular size, etc. (e.g., a high level of granularity).

Generally, a higher level of granularity of the determination of the characteristics of the occupants 452a-452b may enable more relevant statistical information to be used for determining the comfort profile. For example, a granularity of detection of a young female may have a large degree of variation in comfort profiles (e.g., a young female may be tall, or short). In another example, a granularity that provides measurements of particular body parts may enable a selection of a comfort profile that may be more likely to be accurate.

The decision module 158 may determine a reaction according to the comfort profile selected for the occupants 452a-452b. In one example, if the current characteristics of the vehicle 50 (e.g., the current seat location for the seat 502a) is determined to already match the comfort profile for the driver 452a, the decision module 158 may select no reaction (e.g., suppress the reaction).

Figure 10:
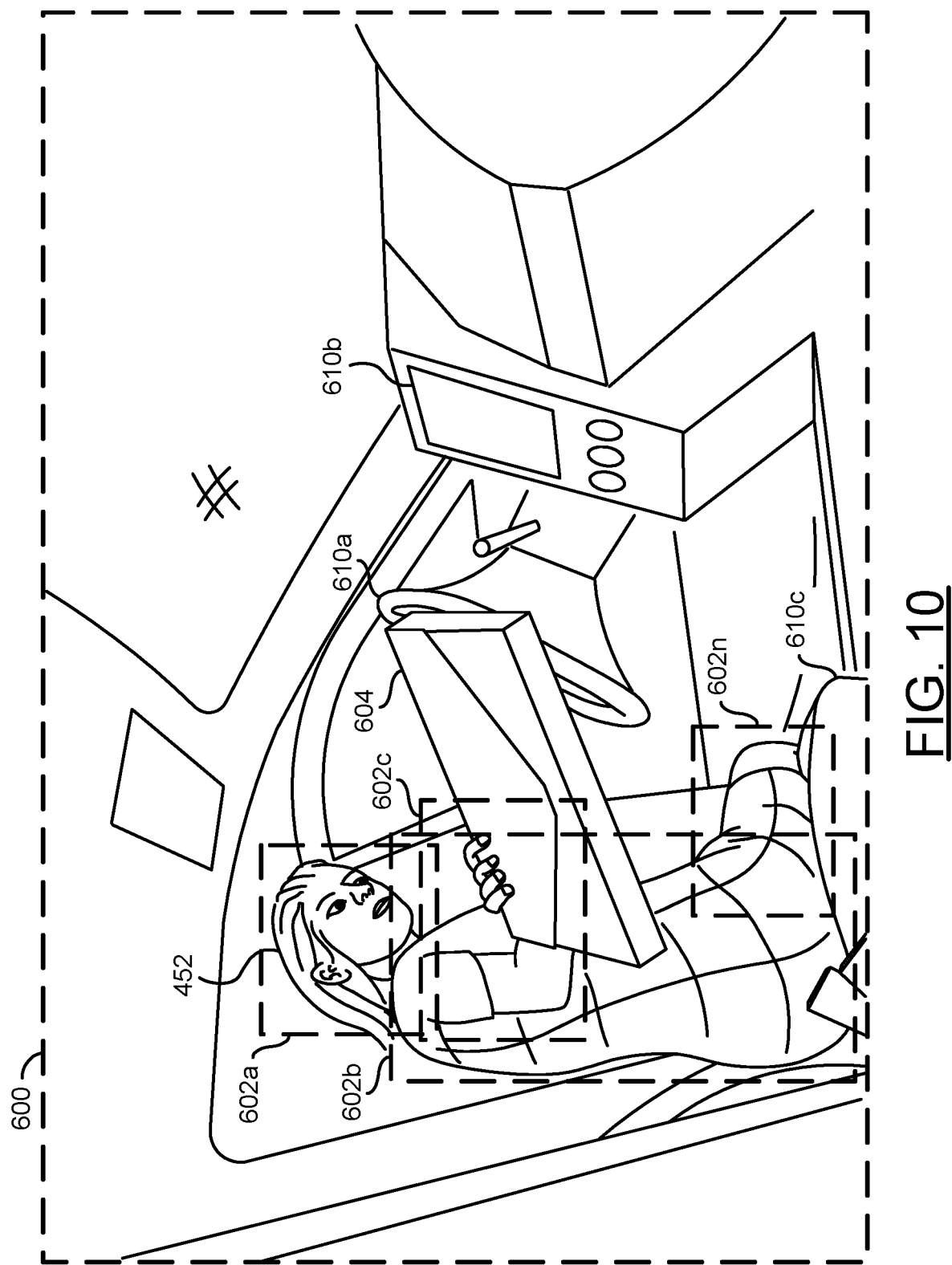
FIG. 10 is a diagram illustrating a processor detecting characteristics of a user entering a vehicle.

Referring to FIG. 10, a diagram illustrating the processors 106a-106n detecting characteristics of a user entering the vehicle 50 is shown. An example video frame 600 is shown. The example video frame 600 may be a video frame of the interior of the vehicle 50 captured by one of the capture devices 102a-102n. The example video frame 600 may be a video frame capturing a view of a user entering the vehicle 50.

In the example shown, the occupant (or user) 452 may be in the process of entering the vehicle 50 through the driver side door (e.g., the user 452 has not yet sat down). In some embodiments, the processors 106a-106n may be configured to detect the characteristics of the user 452 and/or generate the reaction before the user 452 has entered the vehicle and/or sat down. By initiating the reaction before the user 452 has sat down, the vehicle 50 may be pre-configured to the comfort profile for the user 452 when the user 452 is ready to use the vehicle 50 (e.g., the user 452 does not have to wait for the reaction to be applied after getting into the vehicle 50). Furthermore, initiating the reaction before the user 452 has sat down may facilitate entering the vehicle 50 for some users. In an example, if the user 452 is very tall, and the previous occupant of the vehicle 50 had the seat 502a pushed all the way forward towards the steering wheel then the user 452 may not be able to easily enter the vehicle 50 (e.g., the tall user 452 may have to push the seat 502a back before entering). If the decision module 158 initiates the reaction before the tall user enters the vehicle, the tall user may enter without inconvenience. For example, the seats may be pre-adjusted based on the size of the person entering the vehicle 50.

In the example video frame 600, boxes 602a-602n are shown. The boxes 602a-602n may represent various objects detected by the processors 106a-106n. The various objects 602a-602n may correspond to various body parts analyzed. In the example shown, the object 602a may be a head and neck, the object 602b may be a torso and/or upper body, the object 602c may be an arm and/or the object 602n may be a leg. The body parts 602a-602n detected and/or the number of body parts 602a-602n analyzed may be varied according to the design criteria of a particular implementation.

The body parts 602a-602n of the example video frame 600 are shown as representative examples. Different body parts may have greater granularity of detection and/or analysis. For example, the arm 602c is shown. However, in some embodiments, the arm 602c may be detected as many different body parts (e.g., the forearm, the upper arm, the wrist, the hand, the fingers, etc.).

In some embodiments, the body parts 602a-602n may be used to identify the user 452 as a particular individual. In one example, the face 602a may be detected and/or analyzed for facial recognition based comfort profiles. In some embodiments, the body parts 602a-602n may be analyzed to determine body size, limb size, limp shape, body type, body part size, body part shape and/or body proportions. In one example, individual body parts may be used to determine a particular setting for the comfort profile (e.g., a length of the leg 602n may determine how far away the gas/brake pedals should be adjusted).

In the example video frame 600, an object 604 (e.g., an inanimate object) is shown. The processors 106a-106n may be configured to detect the object 604 and/or determine characteristics (e.g., size, approximate weight, etc.) of the object 604. In the example shown, the user 452 may be placing the object 604 on the passenger side seat 502b. In some embodiments, the decision module 158 may determine a comfort profile and/or select a reaction for the object 604. For example, if the object 604 is a baby seat the reaction selected by the decision module 158 may be to move the seat back to provide more room for installing the baby seat.

Vehicle components 610a-610c are shown in the example video frame 600. The vehicle components 610a-610c shown in the video frame 600 may be representative examples of various vehicle components that may be controlled and/or adjusted by the reaction selected by the decision module 158. In one example, the actuators 116 may control and/or adjust the vehicle components 610a-610c in response to the reaction selected by the decision module 158 (e.g., the signal VCTRL'). In one example, the settings of the comfort profile for the user 452 may be realized by adjusting the vehicle components 610a-610c and/or other vehicle components. The number, type and/or available configurations of the vehicle components may be varied according to the design criteria of a particular implementation.

In the example shown, the vehicle component 610a may be the steering wheel, the vehicle component 610b may be the infotainment system and the vehicle component 610c may be the seat. The reaction selected by the decision module 158 in response to the selected comfort profile may adjust the settings of the vehicle components 610a-610c to match settings defined in the selected comfort profile. In one example, the steering wheel 610a may be adjusted (e.g., angled higher or lower) to match the steering wheel angle defined in the comfort profile for the user 452. In another example, the infotainment system 610b may be adjusted (e.g., temperature settings, fan settings, preferred radio station, start playback of audio file at position where the file was previously stopped, stored navigation settings, etc.) to match the various settings of the infotainment system 610b in the comfort profile for the user 452. In yet another example, the seat 610c may be adjusted (e.g., moved forward or backward, seat warming temperature, angle of recline, seatbelt fit, etc.) to match the seat settings in the comfort profile for the user 452.

When the apparatus 100 implements facial recognition and/or the identity of the user 452 is determined to match a specific (e.g., individual) comfort profile, the various vehicle components (e.g., the vehicle components 610a-610c) may be adjusted to match the comfort profile. In some embodiments, the user 452 may have multiple comfort profiles associated with different factors. In one example, the user 452 may have different comfort profiles based on the time of day such as one comfort profile for morning driving (e.g., a comfort profile used for driving to work) and another comfort profile for evening driving (e.g., a comfort profile used for driving to recreational activities). In another example, the user 452 may have different comfort profiles based on the time of year and/or weather conditions such as one comfort profile for summer driving (e.g., preferred air-conditioning settings) and a different comfort profile for winter driving (e.g., preferred heating settings). The number of available comfort profiles for each individual user may be varied according to the design criteria of a particular implementation.

When the apparatus 100 determines the comfort profile based on statistical information, the various body parts 602a-602n may be analyzed and/or measured to determine the characteristics of the user 452 as the user 452 enters the vehicle 50. The proportions of the various body parts 602a-602n may be analyzed (e.g., how long the arm 602c is compared to the leg 602n) to determine the characteristics of the user 452. Based on the characteristics of the user 452, the comfort profile may be determined and the reaction may be selected to adjust the vehicle components 610a-610c. In one example, if the torso/upper body 602b is determined to be higher than the current angle of the steering wheel 610a, the reaction may be to increase the angle of the steering wheel 610a (e.g., raise the steering wheel up to a comfortable position for a person having the detected upper body 602b size). In another example, if the leg 602n is determined to be too short to reach the gas/brake pedals, the reaction may be to move the seat 610c forwards to match the comfort profile of a person with short legs.

Figure 11:
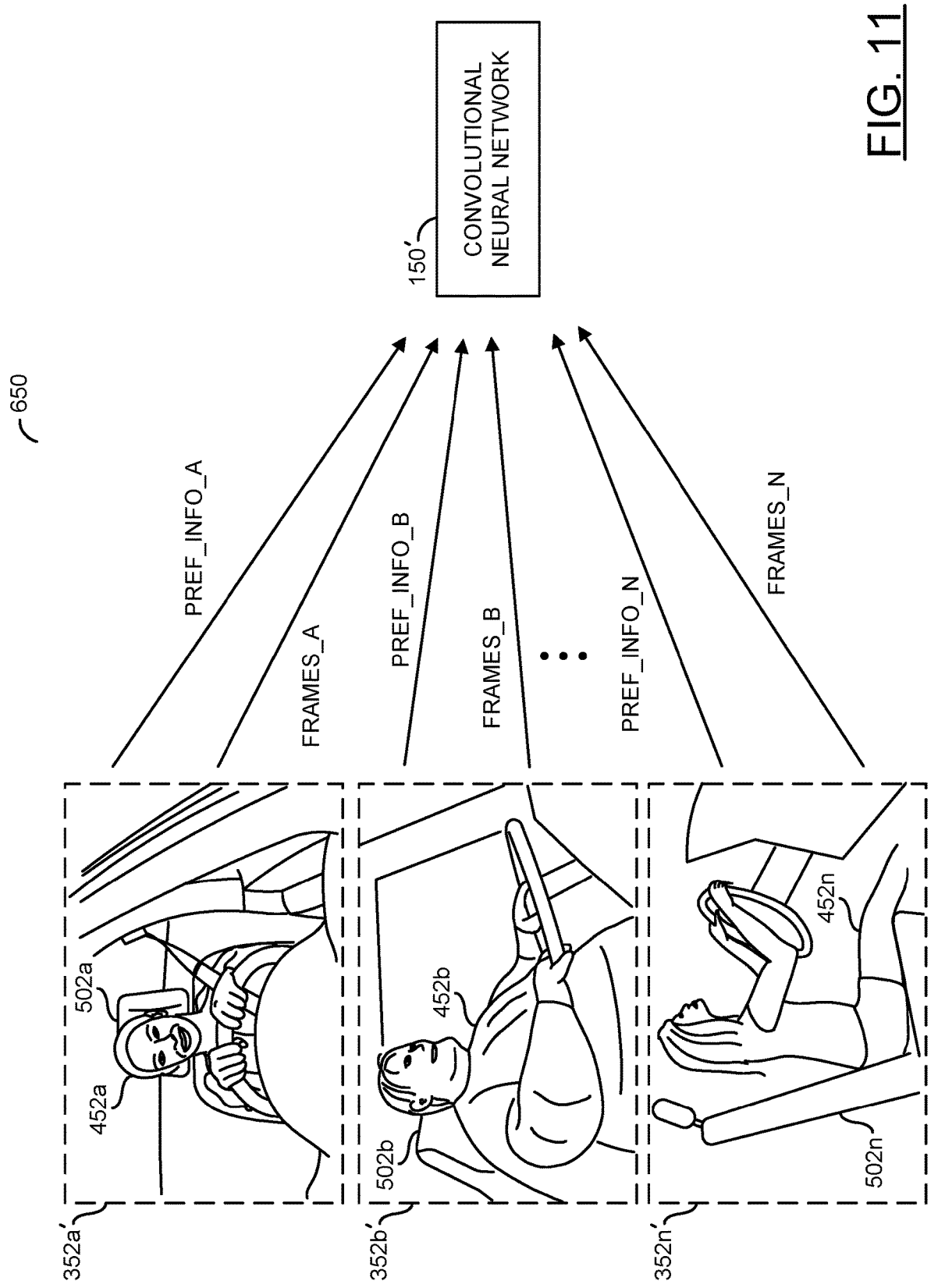
FIG. 11 is a diagram illustrating an example visualization of detecting body types and gathering statistics on user preferences using fleet learning.

Referring to FIG. 11, a diagram illustrating an example visualization 650 of detecting body types and gathering statistics on user preferences using fleet learning is shown. To gather statistical information about body types and user preferences using computer vision, the convolutional neural network 150' may be trained using training data 352a'-352n'. The training data 352a'-352n' may comprise a large amount of information (e.g., input video frames). The information for the training data 352a'-352n' may be received using the video data (e.g., the signals FRAMES_A-FRAMES_N) processed by the video pipeline module 156. In the example visualization 650 shown, the training data 352a'-352n' may comprise video data from numerous vehicles showing many different drivers 452a-452n.

Fleet learning may be implemented to gather large amounts of the training data 352a'-352n'. For example, cameras may be installed in vehicles to capture many reference images of different types of vehicles showing different drivers and/or occupants to be used as the training data 352a'-352n'. In the example shown, the training data 352a'-352n' may capture an occupied interior of a vehicle showing the drivers 452a-452n and/or the driver seats 502a-502n. In the example shown, the training data 352a'-352n' shows only the drivers 452a-452n, however the training data 352a'-352n' may comprise reference images of other occupants in other seats in the interior of the vehicles. Using the training data 352a'-352n' (e.g., video frames captured from many different vehicles as the vehicles are driven), many training data sets may be available to train the CNN module 150'. In an example, different makes and models of vehicles may be analyzed. In another example, different body types of the users 452a-452n may be analyzed. In yet another example, the position of the seats 502a-502n may be analyzed. In some embodiments, the training data 352a'-352n' may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110). The analysis of the training data 352a'-

352*n*' and/or the computer vision operations performed may be similar to the analysis and/or operations of the CNN module 150' described in association with FIG. 5.

Using fleet learning, the CNN module 150' may generate one or more reference objects that have been sufficiently defined to enable reliable recognition using computer vision. The reference objects may correspond with the various body parts 602*a*-602*n* of various body types of the drivers 452*a*-452*n*. In one example, the driver 452*a* shown in the training data 352*a*' may represent a driver with an average build. In another example, the driver 452*b* shown in the training data 352*b*' may represent a driver with a large build. In yet another example, the driver 452*n* shown in the training data 352*n*' may represent a short driver (e.g., the driver may have difficulty seeing over the steering wheel). The training data 352*a*'-352*n*' may be communicated to the CNN module 150' as the signals FRAMES_A-FRAMES_N.

In some embodiments, the computer vision operations may be further implemented to detect and/or train information about the vehicle components. In the example training data 352*a*'-352*n*', the seats 502*a*-502*n* are shown. The computer vision operations may be used to detect and/or compile data about the characteristics of the seats 502*a*-502*n* (or other vehicle components). For example, the CNN module 150' may determine where the seats 502*a*-502*n* are located to determine a seat position in the training data 352*a*'-352*n*'. The seat information may be preference information that may be used to determine the comfort profiles for the various body types of the drivers 452*a*-452*n*.

In some embodiments, the sensors 114 may provide information about the preference information for the vehicle components along with the video training data. For example, data read from the sensors 114 (e.g., data communicated on the CAN bus) may provide details of various components of the vehicle 50. For example, the location of the seats 502*a*-502*n* may be read by the sensors 114 and communicated to the CNN module 150' via the interface 104. In the example visualization 650, signals (e.g., PREF_INFO_A-PREF_INFO_N) are shown communicating the preference information along with the training data in the signals FRAMES_A-FRAMES_N. For example, the signals PREF_INFO_A-PREF_INFO_N may be timestamped to enable the CNN module 150' to associate a data set of preference information (e.g., the characteristics) for the components of the vehicle 50 with the timestamp of the images in the signals FRAMES_A-FRAMES_N.

The CNN module 150' may be configured to cross-reference the video information about the body types of the users 452*a*-452*n* from the training data 352*a*'-352*n*' with the preferences for the components of the vehicles (e.g., measured by the sensors 114 and/or detected using computer vision). The CNN module 150' may be configured to log statistics cross-referencing how the users 452*a*-452*n* look (e.g., body type, gender, build, etc.) and how the users 452*a*-452*n* prefer to have the components of the vehicle adjusted. For example, deep learning may be implemented to build pre-set configurations (e.g., the comfort profiles) based on different combinations of characteristics of the users 452*a*-452*n*. Cross-referencing the body type of the users 452*a*-452*n* with the comfort profiles may enable the apparatus 100 to predict a comfort profile for a user entering the vehicle 50 and provide the reaction to adjust the vehicle characteristics according to the comfort profile.

In one example, the characteristics of the driver 452*a* in the training data video frame 352*a*' may be a female driver with an average height and average build. Using the preferences for the characteristics of the components of the vehicle corresponding to the training data video frame 352*a*' the CNN module 150' may develop a comfort profile for female drivers with an average height and average build. The CNN module 150' may refine the comfort profile for the female drivers with an average height and average build using the training data 352*a*'-352*n*' that also have other female drivers with an average height and average build. When the user 452 enters the vehicle 50 and is determined by the processors 106*a*-106*n* to have characteristics of a female driver with an average height and average build, the decision module 158 may select the comfort profile for the female driver with an average height and average build, and generate the reaction to pre-adjust the components of the vehicle 610*a*-610*c*.

Similarly, the CNN module 150' may develop comfort profiles for the different body types. For example, using the driver 452*b* in the training data video frame 352*b*' (and other training data that correspond to body types similar to the driver 452*b*), the CNN module 150' may develop a comfort profile for a male driver with a large, husky build. In another example, using the driver 452*n* in the training data video frame 352*n*' (and other training data that correspond to body types similar to the driver 452*n*), the CNN module 150' may develop a comfort profile for a female driver with a short height. The comfort profiles developed using fleet learning may be developed statistically. The statistically developed comfort profiles may not match the idiosyncrasies of every user that has a similar body type. However, the statistically developed comfort profiles may have a high likelihood of desirable settings for the components of the vehicle for users that have similar characteristics.

Figure 12:
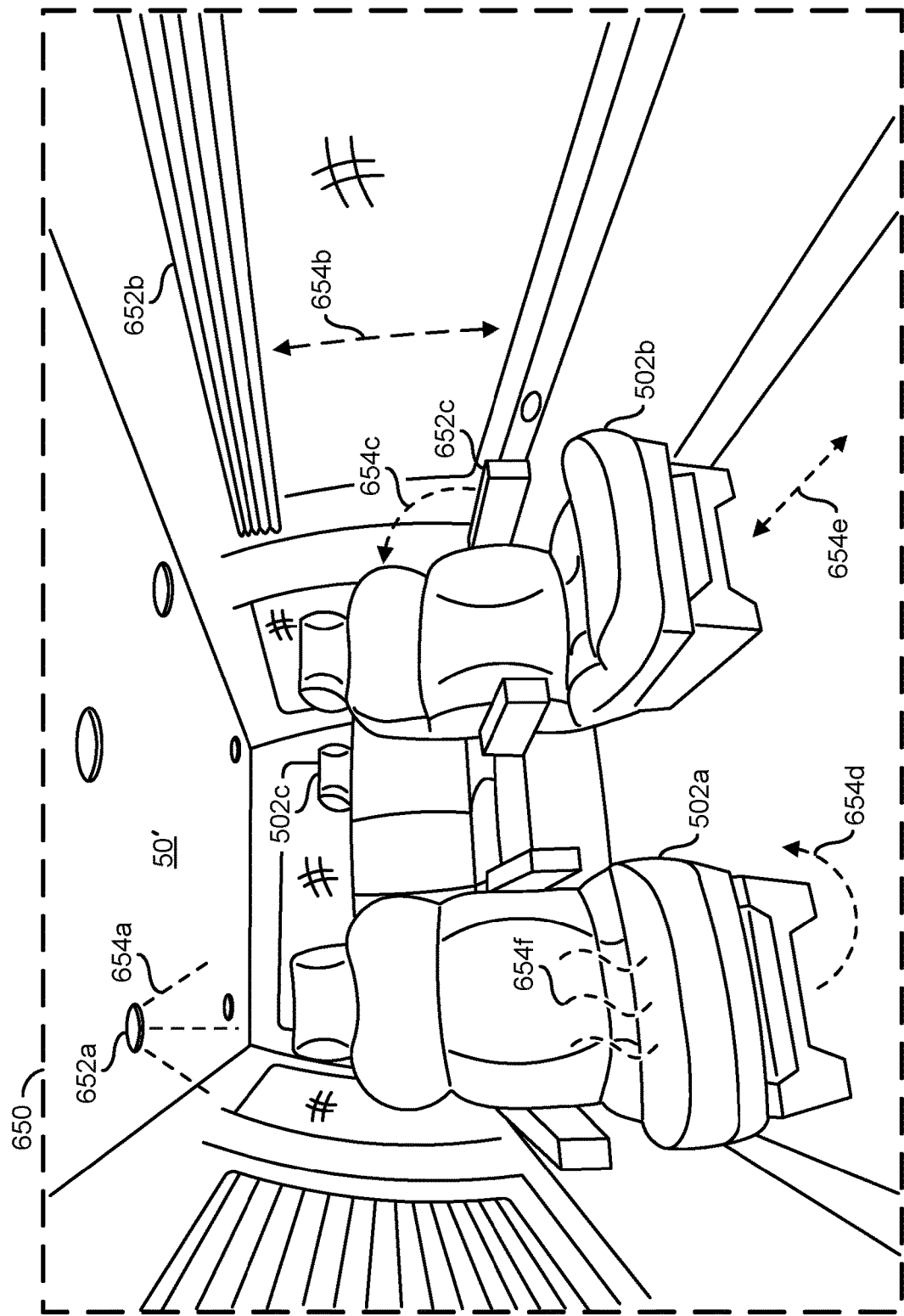
FIG. 12 is a diagram illustrating a processor generating reactions in an autonomous vehicle.

Referring to FIG. 12, a diagram illustrating the processors 106*a*-106*n* generating reactions in an autonomous vehicle is shown. An example video frame 650 is shown. The example video frame 650 may be a video frame captured by the apparatus 100 showing an interior of the vehicle 50'. In the example video frame 650, the vehicle 50' may be an autonomous vehicle. In an example, the autonomous vehicle 50' may be a robot taxi with no driver.

The vehicle 50' in the example video frame 650 may comprise a number of seats 502*a*-502*c*. If the vehicle 50' is autonomous (e.g., driverless), then the seats 502*a*-502*c* may not need to be facing forwards. For example, each of the seats 502*a*-502*c* may be rotated. An angle of rotation of the seats 502*a*-502*c* may be one of the settings preferences of the comfort profile for the user 452.

A number of vehicle components 652*a*-652*c* are shown in the interior of the vehicle 50'. For example, the vehicle component 652*a* may be a light, the vehicle component 652*b* may be window shades and the vehicle component 652*c* may be an armrest of the seat 502*b*. The seats 502*a*-502*c* may also be one of the vehicle components. Other vehicle components (e.g., 652*a*-652*n*, not shown) may be associated with the comfort profiles. The number and/or type of the vehicle components 652*a*-652*c* may be varied according to the design criteria of a particular implementation.

A number of reactions 654*a*-654*f* are shown. Generally, the reactions 654*a*-654*f* correspond with the components of the vehicle 50' (e.g., the vehicle components 652*a*-652*c* and/or the seats 502*a*-502*c*). The reactions 654*a*-654*f* may be selected to enable a matching of the settings of the comfort profile selected by the decision module 158. The reactions 654*a*-654*f* may be initiated in response to the signal VCTRL.

In the example shown, the reaction 654*a* may be an adjustment (e.g., activating, deactivating, dimming, controlling a color, etc.) of the light 652*a*. For example, the user in the seat 502a under the light 652a may have a preference in the comfort profile for the settings of the light 652a. The reaction 654a may adjust the characteristics and/or settings (e.g., brightness) of the light 652a according to the comfort profile. In the example shown, the reaction 654b may be an adjustment (e.g., raising, lowering, adjusting an opacity, etc.) of the shades 652b. For example, the user of the seat 502b near the shades 652b may have a preference in the comfort profile for the settings of the shades 652b. The reaction 654b may adjust the characteristics and/or settings of the shades 652b according to the comfort profile. In the example shown, the reaction 654c may be an adjustment (e.g., raising, lowering, etc.) of the armrest 652c. For example, the user in the seat 502b attached to the armrest 652c may have a preference in the comfort profile for the settings of the armrest 652c. The reaction 654c may adjust the characteristics and/or settings of the armrest 652c according to the comfort profile.

In the example shown, the reaction 654d may be an adjustment (e.g., an angle of rotation) of the seat 502a. For example, the user in the seat 502a may have a preference in the comfort profile for the direction that the seat 502a faces. The reaction 654d may adjust the characteristics and/or settings of the seat 502a according to the comfort profile. In the example shown, the reaction 654e may be an adjustment (e.g., a location) of the seat 502b. The seat 502b may slide forwards and/or backwards. For example, the user in the seat 502b may have a preference in the comfort profile for how far back or how far forward the seat 502b is located. The reaction 654e may adjust the characteristics and/or settings of the seat 502b according to the comfort profile. In the example shown, the reaction 654f may be an adjustment (e.g., a temperature setting, a vibration/massage setting, etc.) of the seat 502a. For example, the user in the seat 502a may have a preference in the comfort profile for the temperature of the seat 502a. The reaction 654f may adjust the characteristics and/or settings of the seat 502a to the particular temperature according to the comfort profile.

Figure 13:
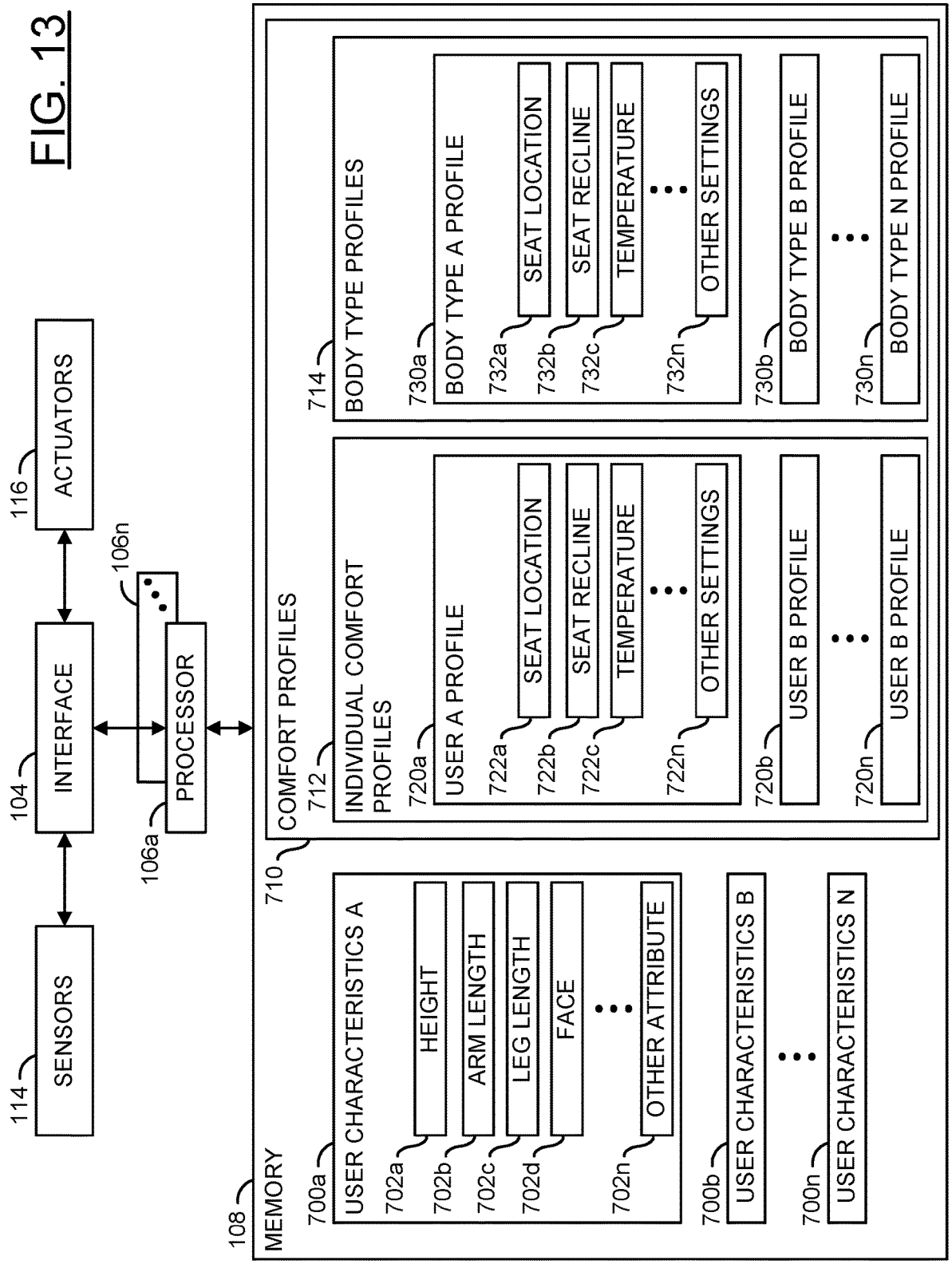
FIG. 13 is a diagram illustrating occupant profiles and comfort profiles.

Referring to FIG. 13, a diagram illustrating occupant profiles and comfort profiles is shown. The interface 104, the processors 106a-106n, the memory 108, the sensors 114 and/or the actuators 116 are shown.

The memory 108 is shown comprising blocks (or circuits) 700a-700n, blocks (or circuits) 702a-702n, a block (or circuit) 710, a block (or circuit) 712, a block (or circuit) 714, blocks (or circuits) 720a-720n, blocks (or circuits) 722a-722n, blocks (or circuits) 730a-730n and/or blocks (or circuits) 732a-732n. The blocks 700a-700n may represent various user characteristic sets. The blocks 702a-702n may comprise the characteristics. The block 710 may comprise the comfort profiles. The block 712 may comprise the individual comfort profiles. The block 714 may comprise the body type comfort profiles. The blocks 720a-720n may comprise the individual user comfort profiles. The blocks 722a-722n may comprise the comfort profile settings. The blocks 730a-730n may comprise the body type class comfort profiles. The blocks 732a-732n may comprise the comfort profile settings. The memory 108 may comprise other components (not shown). The number, type and/or arrangement of the memory 108 may be varied according to the design criteria of a particular implementation.

Each of the user characteristic sets 700a-700n may be configured to store the characteristics 702a-702n for each occupant 452a-452n of the vehicle 50. For clarity, the characteristics 702a-702n are shown for the user characteristic set 700a, however each of the user characteristic sets 700b-700n may similarly comprise the characteristics 702a-702n. The user characteristic sets 700a-700n may be used to distinguish various individuals (e.g., known and/or recognized individuals). For example, one of the user characteristic sets (e.g., 700a) may correspond to the vehicle owner (e.g., a person who commonly uses the vehicle 50).

Generally, a guest in the vehicle 50 may not already have one of the user characteristic sets 700a-700n (e.g., the guest occupant may not be recognized yet). As new occupants enter the vehicle, new user characteristic sets 700a-700n may be generated by the processors 106a-106n as the characteristics 702a-702n are learned and associated with a particular individual. Generally, the user characteristic sets 700a-700n are independent from the seats 502a-502n since the user characteristic sets 700a-700n comprise physical information about the occupants 452a-452n detected by the processors 106a-106n using computer vision operations. The user characteristic sets 700a-700n may be stored for particular individuals long term (e.g., even after the occupant is no longer in the vehicle 50) to enable the apparatus 100 to recognize the occupants 452a-452n and set the comfort profiles as they enter the vehicle 50.

In some embodiments, the user characteristic sets 700a-700n may correspond to occupants 452a-452n that are not recognized. For example, the user characteristic sets 700a-700n may be used to provide general body measurements for selecting the body type profiles determined based on fleet learning.

The characteristics 702a-702n may be a data set of the various types of physical information learned about a particular individual by the processors 106a-106n. In the example shown, the characteristic 702a may be a total height of the occupant, the characteristic 702b may be an arm length of the occupant, the characteristic 702c may be a leg length of the occupant, the characteristic 702d may be the face of the occupant. For example, the face 702d may comprise facial features. The facial features may be determined based on facial recognition. The face 702d may be a face recognition profile used to identify the occupant as a particular individual (e.g., the car owner) by comparing detected facial features (e.g., the faces 510a-510n) with the stored face recognition profile 702d. In an example, the characteristics 702a-702n may correspond to the body parts 602a-602n analyzed by the processors 106a-106n shown in association with FIG. 10. The number and/or type of characteristics 702a-702n associated with each occupant may be varied according to the design criteria of a particular implementation.

The comfort profiles 710 may comprise the individual comfort profiles 712 and the body type profiles 714. The comfort profiles 710 may be loaded by the actuators 116 of the vehicle 50. For example, the sensors 114 may be configured to determine the current configuration of the vehicle components 652a-652n. The processors 106a-106n may request the comfort profile 710 from the memory 108. The memory 108 may provide the comfort profile 710. The processors 106a-106n may compare the current configuration of the vehicle components 652a-652n with the comfort profiles 710. The processors 106a-106n may load the comfort profiles 710 by sending instructions to the actuators 116 to move the components 652a-652n to the orientation defined by the comfort profiles 710.

The individual comfort profiles 712 may comprise the preferences for recognized and/or identified individuals. The individual comfort profiles 712 may comprise the individual user comfort profiles 720a-720n. For example each of the individual user comfort profiles 720a-720n may be potentially unique to a particular person. For example, the individual user comfort profile 720a may correspond to the vehicle owner. For example, the occupant 452a may enter the vehicle 50 and the processors 106a-106n may detect the face 702d of the user 700a and load the individual comfort profile 720a. Generally, the individual user comfort profiles 720a-720n are selected when one of the occupants 452a-452n are identified as a specific person.

The individual user comfort profiles 720a-720n may have multiple entries for the same specific person. For example, the specific person (e.g., the vehicle owner) may have one of the individual user comfort profiles 720a-720n for each of the seats 502a-502n (e.g., corresponding to different preferences when seated in different locations). The individual comfort profiles 720a-720n may be loaded depending on the seat 502a-502n that the identified user is occupying.

Each of the individual user comfort profiles 720a-720n may be configured to store the comfort profile settings 722a-722n. For clarity, the comfort profile settings 722a-722n are shown for the individual user comfort profile 720a, however each of the individual user comfort profiles 720b-720n may similarly comprise the comfort profile settings 722a-722n.

The comfort profile settings 722a-722n may be loaded by the processors 106a-106n. The comfort profile settings 722a-722n may correspond to a configuration of the vehicle components 652a-652n. For example, the reactions 654a-654n initiated by the processors 106a-106n may adjust the current configuration of the vehicle components 652a-652n determined by the sensors 114 to match the comfort profile settings 722a-722n.

In the example shown, the comfort profile setting 722a may be a seat location (e.g., for a particular one of the seats 502a-502n), the comfort profile setting 722b may be an angle of recline for a particular one of the seats 502a-502n and the comfort profile setting 722c may be a temperature preference. The number, type, data type and/or value limitations for the comfort profile settings 722a-722n may be varied according to the design criteria of a particular implementation. In some embodiments, the comfort profile settings 722a-722n may be pre-defined settings for a particular one of the seats 502a-502n.

In some embodiments, the individual user comfort profiles 720a-720n may be determined based on supplemental information received from a user device. For example, the user device may be a smart phone, a smart watch and/or some other portable device configured to perform wireless communication. For example, the smart phone may wirelessly pair with the vehicle 50 to provide information to the processors 106a-106n. The supplemental information may comprise an identity (e.g., an email address, a social network profile, a profile stored by a vehicle provider, etc.). The identity from the user device may be used to supplement the characteristics 702a-702n used to determine the unique identity of the occupants 452a-452n (e.g., increase a confidence level of the detection).

The body type comfort profiles 714 may comprise the preferences for the occupants 452a-452n based on statistical information learned based on fleet learning. The body type comfort profiles 714 may comprise the body type class comfort profiles 730a-730n. For example, the body type class comfort profiles 730a-730n may be used when one of the occupants 452a-452n is not known (or recognized). In an example, an unknown occupant 452a may enter the vehicle 50 and the processors 106a-106n may detect the body parts 602a-602n and attempt to match the body size of the unknown occupant to one of the body type class comfort profiles 730a-730n. The best match of the body type class comfort profiles 730a-730n to the detected body parts 602a-602n may be loaded. Generally, the body type class comfort profiles 730a-730n are selected when the occupants 452a-452n are not identified as a specific person.

Each of the body type class comfort profiles 730a-730n may be configured to store the comfort profile settings 732a-732n. For clarity, the comfort profile settings 732a-732n are shown for the body type class comfort profiles 730a, however each of the body type class comfort profiles 730b-730n may similarly comprise the comfort profile settings 732a-732n. The comfort profile settings 732a-732n may be similar to the comfort profile settings 722a-722n. The comfort profile settings 732a-732n of the body type class comfort profiles 730a-730n may be used to predict the orientation of the vehicle components 652a-652n for occupants having the characteristics 702a-702n that correspond to similar body types (e.g., based on the reference images 352a'-352n').

Figure 14:
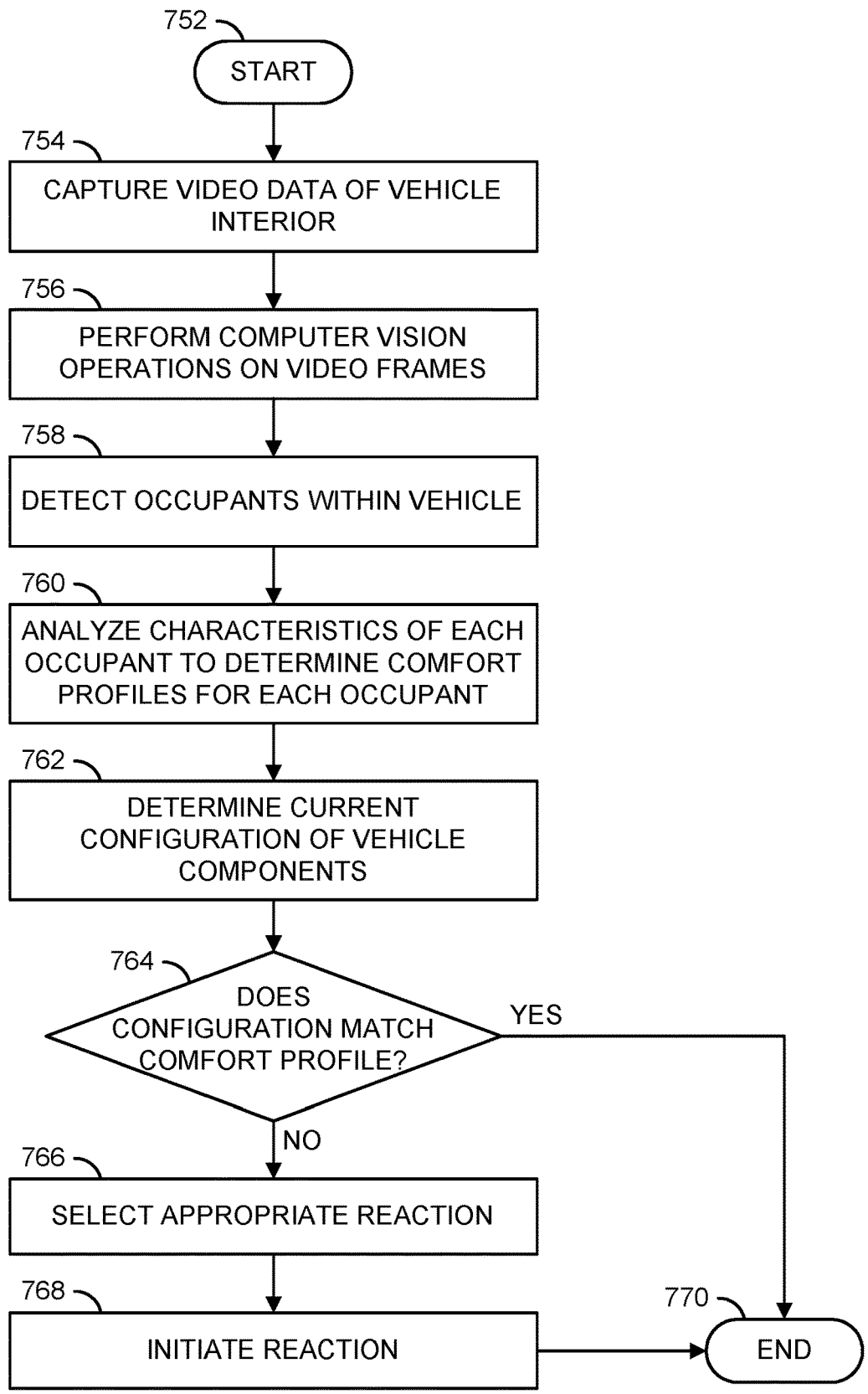
FIG. 14 is a flow diagram illustrating a method for determining comfort settings in vehicles using computer vision.

Referring to FIG. 14, a method (or process) 750 is shown. The method 750 may determine comfort settings in vehicles using computer vision. The method 750 generally comprises a step (or state) 752, a step (or state) 754, a step (or state) 756, a step (or state) 758, a step (or state) 760, a step (or state) 762, a decision step (or state) 764, a step (or state) 766, a step (or state) 768, and a step (or state) 770.

The step 752 may start the method 750. Next, in the step 754, the processors 106a-106n may receive the video data of the interior of the vehicle 50 captured by the capture devices 102a-102n. In the step 756, the processors 106a-106n (e.g., the CNN module 150) may perform the computer vision operations on the captured video frames (e.g., the video frames FRAMES_A-FRAMES_N). Next, in the step 758, the processors 106a-106n may detect the occupants 452a-452n within the vehicle 50. Next, the method 750 may move to the step 760.

In the step 760, the processors 106a-106n may analyze the characteristics (e.g., the body parts 602a-602n and/or the faces 510a-510n) of each of the occupants 452a-452n to determine the comfort profiles 712 for each occupant. In an example, one or more of the occupants 452a-452n may be recognized as a specific person and one of the user comfort profiles 720a-720n may be selected. In another example, one or more of the occupants 452a-452n may not be recognized, and one of the body type comfort profiles 730a-730n may be selected. Next, in the step 762, the processors 106a-106n may determine the current configuration of the vehicle components 652a-652n (e.g., received via the signal SEN received from the sensors 114). Next, the method 750 may move to the decision step 764.

In the decision step 764, the processors 106a-106n may determine whether the current configuration of the vehicle components 652a-652n matches the selected comfort profile 712 (e.g., the comfort profile settings 722a-722n or 732a-732n). If the current configuration does match the selected comfort profile 712, the method 750 may move to the step 770 (e.g., no adjustment needs to be performed). If the current configuration does not match the selected comfort profile 712, the method 750 may move to the step 766.

In the step 766, the processors 106a-106n may select the appropriate reactions 654a-654n. The appropriate reactions may be the adjustments needed to the vehicle components 652a-652n in order to match the configuration defined by the comfort profile settings 722a-722n (or 732a-732n). Next, in the step 768, the processors 768 may initiate the reactions 654a-654n. The reactions 654a-654n may be initiated by providing the signal VCTRL to the actuators 116 via the interface 104. Next, the method 750 may move to the step 770. The step 770 may end the method 750.

Figure 15:
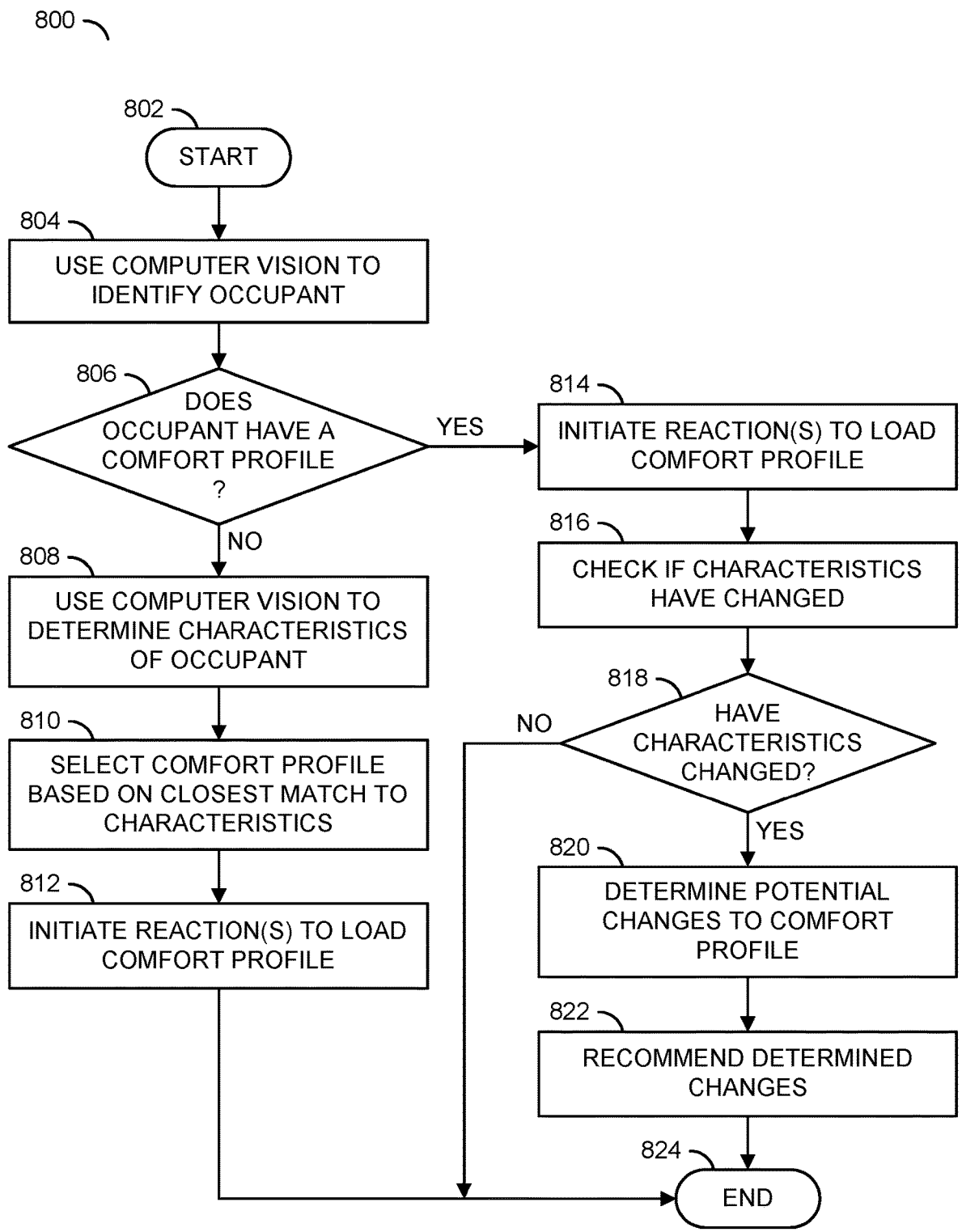
FIG. 15 is a flow diagram illustrating a method for selecting a comfort profile.

Referring to FIG. 15, a method (or process) 800 is shown. The method 800 may select a comfort profile. The method 800 generally comprises a step (or state) 802, a step (or state) 804, a decision step (or state) 806, a step (or state) 808, a step (or state) 810, a step (or state) 812, a step (or state) 814, a step (or state) 816, a decision step (or state) 818, a step (or state) 820, a step (or state) 822, and a step (or state) 824.

The step 802 may start the method 800. Next, in the step 804, the processors 106a-106n (or the CNN module 150) may use the computer vision operations to identify the occupant 452a. In an example, the identification may be based on the body parts 602a-602n detected and/or the faces 510a-510n detected matching the user characteristic sets 700a-700n. Next, the method 800 may move to the decision step 806.

In the decision step 806, the processors 106a-106n may query the memory 108 to determine whether the detected occupant 452a has one of the individual user comfort profiles 720a-720n. If the occupant 452a does not match one of the individual user comfort profiles 720a-720n, the method 800 may move to the step 808. In the step 808, the processors 106a-106n may use the computer vision operations to determine the characteristics 702a-702n of the occupant 452a. Next, in the step 810, the processors 106a-106n may select one of the body type comfort profiles 730a-730n based on a closest match to the characteristics 702a-702n. Next, in the step 812, the processors 106a-106n may initiate the reactions 654a-654n to load the comfort profile settings 732a-732n. Next, the method 800 may move to the step 824.

In the decision step 806, if the processors 106a-106n determine that the detected occupant 452a has one of the individual comfort profiles 720a-720n, the method 800 may move to the step 814. In the step 814, the processors 106a-106n may initiate the reactions 654a-654n to match the orientation of the vehicle components 652a-652n to the comfort profile settings 722a-722n. Next, in the step 816, the processors 106a-106n may check the body parts 602a-602n to determine if there have been any changes compared to the stored characteristics 702a-702n. Next, the method 800 may move to the decision step 818.

In the decision step 818, the processors 106a-106n may determine whether the characteristics 702a-702n have changed. For example, a young occupant may have grown, or an occupant may have gained/lost weight. If the characteristics 702a-702n have not changed, the method 800 may move to the step 824. If the characteristics 702a-702n have changed, the method 800 may move to the step 820.

In the step 820, the processors 106a-106n may determine potential changes to the associated one of the individual user comfort profiles 720a-720n. For example, the potential change may be determined based on the statistical information based on fleet learning. Next, in the step 822, the processors 106a-106n may initiate a reaction to recommend the determined change (for example, a touchscreen display of an infotainment unit 610b may provide a notification to make the recommended change). Next, the method 800 may move to the step 824. The step 824 may end the method 800.

Figure 16:
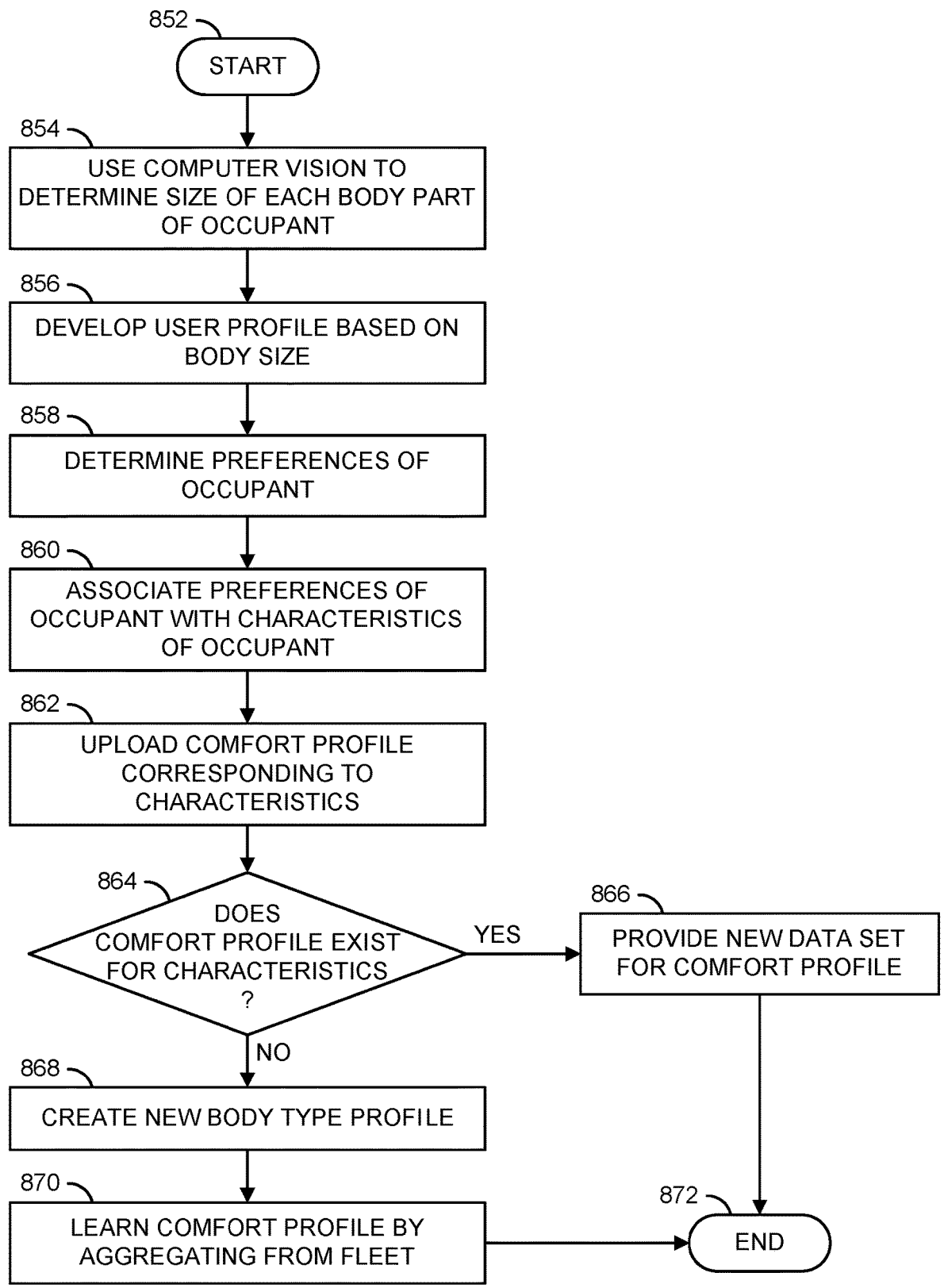
FIG. 16 is a flow diagram illustrating a method for developing comfort profiles using fleet learning.

Referring to FIG. 16, a method (or process) 850 is shown. The method 850 may develop comfort profiles using fleet learning. The method 850 generally comprises a step (or state) 852, a step (or state) 854, a step (or state) 856, a step (or state) 858, a step (or state) 860, a step (or state) 862, a decision step (or state) 864, a step (or state) 866, a step (or state) 868, a step (or state) 870, and a step (or state) 872.

The step 852 may start the method 850. Next, in the step 854, the processors 106a-106n (or the CNN module 150) may use computer vision operations to determine the size of each of the body parts 602a-602n of the occupant 452a. In the step 856, the processors 106a-106n may develop one of the user characteristic profiles 700a-700n based on the body part sizes detected in order to develop one of the individual comfort profiles 720a-720n. In the step 858, the processors 106a-106n may read the data from the sensors 114 (or perform the computer vision operations) to determine the preferences of the occupant 452a associated with the orientation of the vehicle components 652a-652n. Next, the method 850 may move to the step 860.

In the step 860, the processors 106a-106n may associate the preferences of the occupant 452a with the characteristics 702a-702n. Next, in the step 862, the communication devices 110 may upload the comfort profile 730a corresponding to the characteristics 702a-702n of the occupant 452a. For example, the processors 106a-106n may create a new body type comfort profile based on the body type of the occupant and the preferences detected. In an example, the comfort profiles may be uploaded to a cloud service providing the various comfort profiles and/or the CNN module 150' performing the fleet learning statistical analysis. Next, the method 850 may move to the decision step 864.

In the decision step 864, the cloud service and/or the CNN module 150' may determine whether a comfort profile exists for the characteristics 702a-702n determined for the occupant 452a. If the comfort profile does exist, then the comfort settings 732a-732n associated with the detected body parts 602a-602n may provide a new data set for the body type comfort profile (e.g., more data for fleet learning). Next, the method 850 may move to the step 872.

In the decision step 864, if the comfort profile does not exist, the method 850 may move to the step 868. In the step 868, a new one of the body type comfort profiles 730a-730n may be created. Next, in the step 870, the new body type comfort profile may be learned by aggregating data about similar body types and the orientation of the vehicle components preferred by people with similar body types. Aggregating the data from many vehicles may provide the data for fleet learning. Next, the method 850 may move to the step 872. The step 872 may end the method 850.

Figure 17:
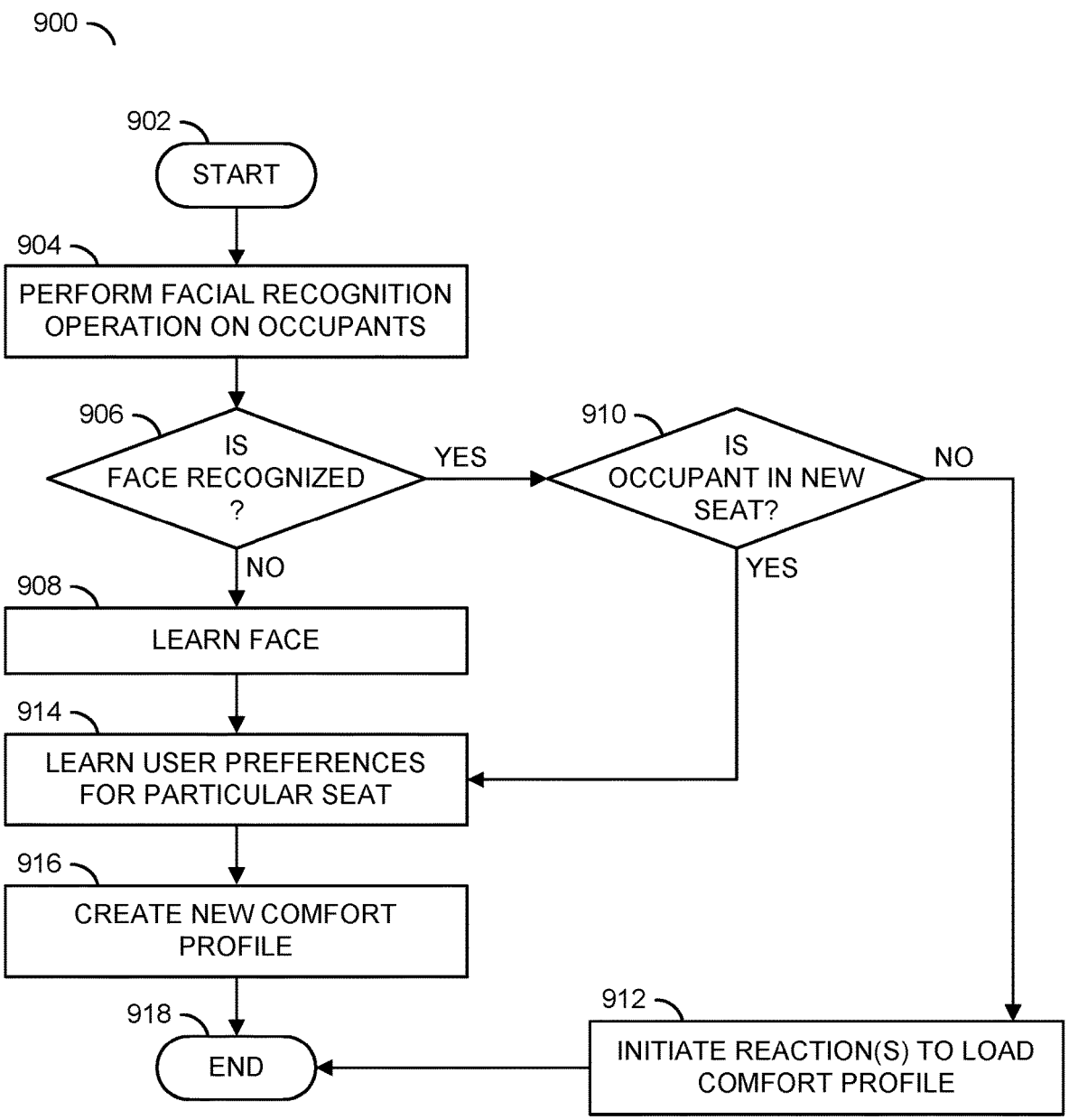
FIG. 17 is a flow diagram illustrating a method for using different comfort profiles for different seats.

Referring to FIG. 17, a method (or process) 900 is shown. The method 900 may use different comfort profiles for different seats. The method 900 generally comprises a step (or state) 902, a step (or state) 904, a decision step (or state) 906, a step (or state) 908, a decision step (or state) 910, a step (or state) 912, a step (or state) 914, a step (or state) 916, and a step (or state) 918.

The step 902 may start the method 900. Next, in the step 904, the processors 106a-106n may perform facial recognition video operations on the occupants 452a-452n. For example, the processors 106a-106n may analyze the facial features detected. Next, in the decision step 906, the processors 106a-106n may determine whether the faces are recognized. For example, the CNN module 150 may compare the detected facial features of the faces 510a-510n with the stored faces 702d of the user characteristic data sets 700a-700n. If the face is not recognized, the method 900 may move to the step 908.

In the step 908, the processors 106a-106n may learn the faces 510a-510n. In an examples, the new detected faces 510a-510n may be stored as one of the characteristics 702d for the newly created user characteristics data sets 700a-700n associated with the occupants 452a-452n. Next, the method 900 may move to the step 914. In the decision step 906, if the processors 106a-106n determine that the face is recognized (e.g., one of the stored faces 702d of the already existing user characteristic data sets 700a-700n), the method 900 may move to the decision step 910.

In the decision step 910, the processors 106a-106n may determine whether the recognized occupant is in a new (e.g., different) seat. For example, each of the user comfort profiles 720a-720n may be associated with the recognized occupants for a particular one of the seats 502a-502n. If the recognized occupant is not in a new seat (e.g., one of the user comfort profiles 720a-720n for the particular seat already exists), the method 900 may move to the step 912. In the step 912, the processors 106a-106n may initiate the reactions 654a-654n to load the appropriate one of the user comfort profiles 720a-720n.

In the decision step 910, if the recognized occupant is in a different seat, the method 900 may move to the step 914. In the step 914, the processors 106a-106n may learn the user preferences for the particular seat by receiving the information about the components 652a-652n from the sensors 114 (or based on the computer vision operations). Next, in the step 916, the processors 106a-106n may create a new one of the user comfort profiles 720a-720n. Next, the method 900 may move to the step 918. The step 918 may end the method 900.

The functions performed by the diagrams of FIGS. 1-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data; and
   a processor configured to (i) process said pixel data arranged as video frames, (ii) perform computer vision operations to detect one or more objects in said video frames, (iii) detect users based on said objects detected in said video frames, (iv) determine a comfort profile corresponding to said users detected and (v) select a reaction to adjust an environment according to said comfort profile of said users detected, wherein
   (a) said comfort profile is determined in response to characteristics of said users,
   (b) said characteristics of said users are determined by performing said computer vision operations on each of said users,
   (c) said computer vision operations detect said users by performing feature extraction based on weight values for each of a plurality of visual features that are associated with said users extracted from said video frames,
   (d) said weight values are determined in response to an analysis of training data by said processor prior to said feature extraction, and
   (e) a data flow of said feature extraction comprises manipulating lists of regions of a vector that each share a common attribute and are grouped together based on said visual features.

2. The apparatus according to claim 1, wherein said characteristics of said users comprise a shape and size of body parts of said users detected by said computer vision operations.

3. The apparatus according to claim 1, wherein said characteristics of said users comprise facial features of said users detected by said computer vision operations.

4. The apparatus according to claim 3, wherein (i) said processor is further configured to compare said facial features detected with stored face recognition profiles and (ii) said comfort profile comprises pre-defined settings for said environment specific to one of said users corresponding to a matching one of said face recognition profiles.

5. The apparatus according to claim 1, wherein (i) said video frames comprise images of at least one of said users before entering said environment and (ii) said reaction is performed before said one of said users interacts with said environment.

6. The apparatus according to claim 1, wherein (i) said video frames comprise images of at least one of said users within said environment and (ii) said reaction is performed while at least one of said users is in said environment.

7. The apparatus according to claim 1, wherein (i) said reaction is performed for each adjustable component of said environment corresponding to one of said users and (ii) and said reaction selected for each of said adjustable component is based on said comfort profile for a corresponding one of said users.

8. The apparatus according to claim 1, wherein (i) said environment comprises a vehicle and (ii) said reaction is further configured to adjust vehicle components of said vehicle corresponding to said comfort profile for a specific seat of said vehicle.

9. The apparatus according to claim 1, wherein said comfort profile comprises at least one of: a location of a seat, an angle of recline of said seat, an arm rest position for said seat, a temperature setting, fan settings, light settings, infotainment center settings, an angle of rotation of said seat, or a steering wheel position.

10. The apparatus according to claim 1, wherein said comfort profile is further determined based on supplemental information received from a smart phone.

11. The apparatus according to claim 1, wherein stored adjustments from said users with similar body proportions are determined in response to using fleet learning.

12. The apparatus according to claim 11, wherein (i) said fleet learning comprises capturing reference images using capture devices implemented in a plurality of vehicles, (ii) said reference images comprise occupied interiors of said plurality of vehicles, (iii) said reference images are used as training data for said stored adjustments from said users with said similar body proportions and (iv) said training data comprises said reference images from many different vehicles.

13. The apparatus according to claim 12, wherein (i) said training data further comprises body type information of said users in said reference images and associated comfort profiles for said body type information and (ii) said associated comfort profiles are used to predict said comfort profile for said users with said characteristics that correspond to similar body types from said reference images.

14. The apparatus according to claim 1, wherein said computer vision operations are further performed by (a) applying a feature detection window to each of a 4 plurality of layers generated from said video frames by said 5 processor and (b) sliding said feature detection window along each of said plurality of layers.

15. The apparatus according to claim 14, wherein said computer vision operations are further performed by applying a convolution operation using matrix multiplication of said plurality of layers defined by said feature detection window applied to said video frames.

16. A method for selecting a comfort profile, comprising the steps of:
(A) generating a plurality of video frames corresponding to users of a vehicle using a capture device;
(B) performing computer vision operations using a processor to detect objects in said video frames by applying a feature detection window to each of a plurality of layers in each of the video frames;
(C) detecting users of said vehicle based on said objects detected in said video frames; and
(D) selecting a reaction to adjust vehicle components according to said comfort profile of said detected users, wherein, (i) said comfort profile is determined in response to characteristics of said users, (ii) said characteristics of said users are determined by performing said computer vision operations on each of said users and (iii) said computer vision operations are performed by applying a convolution operation using matrix multiplication of said plurality of layers defined by said feature detection window.

17. The method according to claim 16, wherein said characteristics of said users comprise a shape and size of body parts of said users detected by said computer vision operations.

18. The method according to claim 16, wherein said characteristics of said users comprise facial features of said users detected by said computer vision operations.

19. The apparatus according to claim 1, wherein (i) individual settings for said comfort profile are modified based on detected factors and (ii) said detected factors comprise at least one of: a time of day and weather conditions.

* * * * *